(12) United States Patent
Urasawa

(10) Patent No.: US 9,641,710 B2
(45) Date of Patent: May 2, 2017

(54) INFORMATION PROCESSING APPARATUS THAT DISPLAYS DESTINATION DISPLAY INFORMATION ACCORDING TO DISPLAY CONDITION

(71) Applicant: Oki Data Corporation, Tokyo (JP)

(72) Inventor: Koji Urasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 34 days.

(21) Appl. No.: 14/540,661

(22) Filed: Nov. 13, 2014

(65) Prior Publication Data

US 2015/0146248 A1    May 28, 2015

(30) Foreign Application Priority Data

Nov. 28, 2013    (JP) .................................. 2013-246714

(51) Int. Cl.
*G06F 3/12*    (2006.01)
*H04N 1/00*    (2006.01)

(52) U.S. Cl.
CPC ..... *H04N 1/00509* (2013.01); *H04N 1/00419* (2013.01)

(58) Field of Classification Search
CPC combination set(s) only.
See application file for complete search history.

(56) References Cited

U.S. PATENT DOCUMENTS

| 2006/0035632 | A1* | 2/2006 | Sorvari | H04M 1/271 |
| | | | | 455/418 |
| 2011/0002007 | A1* | 1/2011 | Okada | H04N 1/00222 |
| | | | | 358/1.15 |
| 2013/0120785 | A1* | 5/2013 | Terao | G06K 15/02 |
| | | | | 358/1.14 |
| 2013/0321474 | A1* | 12/2013 | Horiike | G09G 5/34 |
| | | | | 345/684 |

FOREIGN PATENT DOCUMENTS

JP    2007-081652 A    3/2007

* cited by examiner

*Primary Examiner* — Henok A Shiferaw
(74) *Attorney, Agent, or Firm* — Muncy, Geissler, Olds & Lowe, P.C.

(57) ABSTRACT

An information processing apparatus includes: a memory that stores destination information; an operation part that receives an operation; a for-display destination information generation part that generates for-display destination information based on the destination information; and a display part that displays the for-display destination information. The operation part receives a display switch operation, the destination information includes a first destination information group and a second destination information group, and the for-display destination information generation part, based on a single operation of the display switch operation, switches the for-display destination information between a display of the first destination information group, a display of the second destination information group, and a display of both of the first destination information group and the second destination information group.

6 Claims, 22 Drawing Sheets

Fig. 13

Address Book

| | | | |
|---|---|---|---|
| ☐ PSNL | #001 | Shimizu Yasushi | shimizu@aaa.com |
| ☐ PSNL | #002 | Yoshida Satoru | yoshida@bbb.com |
| ☐ PSNL | #003 | Suzuki Takashi | suzuki@ccc.com |
| ☐ PSNL | #004 | Murata Yumi | murata@xxx.co.jp |
| ☐ PSNL | #005 | Hara Eiji | hara@aaa.com |
| ☐ PSNL | #006 | Tanaka Ryuji | tanaka@aaa.com |
| ☐ PSNL | #007 | Kitano Yuji | kitano@ccc.com |
| ☐ PSNL | #008 | Matsuda Toru | matsuda@zzz.co.jp |
| ☑ PSNL | #009 | Ikeda Hitoshi | ikeda@zzz.co.jp |
| ☐ PSNL | #010 | Sakai Naoki | sakai@ccc.com |

Tabs: PSNL / SHR / SIMO

Cancel | Decide

Fig. 14

Address Book

| | | | |
|---|---|---|---|
| ☐ SHR | #007 | Aida Kenji | aida@bbb.com |
| ☐ SHR | #008 | Arai Satoshi | arai@bbb.com |
| ☑ SHR | #003 | Fujii Koji | fujii@yyy.ne.jp |
| ☐ PSNL | #005 | Hara Eiji | hara@aaa.com |
| ☐ SHR | #004 | Hayashi Jun | hayashi@ccc.com |
| ☑ PSNL | #009 | Ikeda Hitoshi | ikeda@zzz.co.jp |
| ☐ SHR | #009 | Inoue Akira | inoue@xxx.co.jp |
| ☐ SHR | #001 | Kato Ken | kato@aaa.com |
| ☐ SHR | #002 | Kimura Jiro | kimura@bbb.com |
| ☐ PSNL | #007 | Kitano Yuji | kitano@ccc.com |

Tabs: PSNL / SHR / SIMO

Cancel | Decide

*Fig. 17*

| Selection | Address Book | Reg. No. | Destination Name | Address Information |
|---|---|---|---|---|
|  | SHR | #007 | Aida Kenji | aida@bbb.com |
|  | SHR | #008 | Arai Satoshi | arai@bbb.com |
| ON | SHR | #003 | Fujii Koji | fujii@yyy.ne.jp |
|  | PSNL | #005 | Hara Eiji | hara@aaa.com |
|  | SHR | #004 | Hayashi Jun | hayashi@ccc.com |
| ON | PSNL | #009 | Ikeda Hitoshi | ikeda@zzz.co.jp |
|  | SHR | #009 | Inoue Akira | inoue@xxx.co.jp |
|  | SHR | #001 | Kato Ken | kato@aaa.com |
|  | SHR | #002 | Kimura Jiro | kimura@bbb.com |
|  | PSNL | #007 | Kitano Yuji | kitano@ccc.com |
|  | PSNL | #008 | Matsuda Toru | matsuda@zzz.co.jp |
|  | SHR | #006 | Miura Masashi | miura@zzz.co.jp |
|  | PSNL | #004 | Murata Yumi | murata@xxx.co.jp |
|  | SHR | #010 | Saida Makoto | saida@aaa.com |
|  | SHR | #005 | Saito Noboru | saito@yyy.ne.jp |
|  | PSNL | #010 | Sakai Naoki | sakai@ccc.com |
|  | PSNL | #001 | Shimizu Yasushi | shimizu@aaa.com |
|  | PSNL | #003 | Suzuki Takashi | suzuki@ccc.com |
|  | PSNL | #006 | Tanaka Ryuji | tanaka@aaa.com |
|  | PSNL | #002 | Yoshida Satoru | yoshida@bbb.com |

Fig. 18

| Reg. No. | Destination Name | Address Information |
|---|---|---|
| #001 | Shimizu Yasushi | shimizu@aaa.com |
| #002 | Yoshida Satoru | yoshida@bbb.com |
| #003 | Suzuki Takashi | suzuki@ccc.com |
| #004 | Murata Yumi | murata@xxx.co.jp |
| #005 | Hara Eiji | hara@aaa.com |
| #006 | Tanaka Ryuji | tanaka@aaa.com |
| #007 | Kitano Yuji | kitano@ccc.com |
| #008 | Matsuda Toru | matsuda@zzz.co.jp |
| #009 | Ikeda Hitoshi | ikeda@zzz.co.jp |
| #010 | Sakai Naoki | sakai@ccc.com |

| Reg. No. | Destination Name | Address Information |
|---|---|---|
| #001 | Kato Ken | kato@aaa.com |
| #002 | Kimura Jiro | kimura@bbb.com |
| #003 | Fujii Koji | fujii@yyy.ne.jp |
| #004 | Hayashi Jun | hayashi@ccc.com |
| #005 | Saito Noboru | saito@yyy.ne.jp |
| #006 | Miura Masashi | miura@zzz.co.jp |
| #007 | Aida Kenji | aida@bbb.com |
| #008 | Arai Satoshi | arai@bbb.com |
| #009 | Inoue Akira | inoue@xxx.co.jp |
| #010 | Saida Makoto | saida@aaa.com |

| Selection | Address Book | Reg. No. | Destination Name | Address Information | Additional Information |
|---|---|---|---|---|---|
|  | PSNL | #004 | Aida Kenji | aida@bbb.com |  |
|  | SHR | #007 | Aida Kenji | aida@bbb.com |  |
|  | PSNL | #009 | Aoki Taro | aoki@zzz.co.jp |  |
| ON | PSNL | #010 | Arai Satoshi | arai@yyy.ne.jp |  |
|  | SHR | #008 | Arai Satoshi | arai@bbb.com |  |
|  | SHR | #003 | Fujii Koji | fujii@yyy.ne.jp |  |
|  | SHR | #004 | Hayashi Jun | hayashi@ccc.com |  |
|  | SHR | #009 | Inoue Akira | inoue@xxx.co.jp |  |
|  | PSNL | #003 | Ito Yasuo | ito@xxx.co.jp |  |
|  | SHR | #001 | Kato Ken | kato@aaa.com |  |
|  | SHR | #002 | Kimura Jiro | kimura@bbb.com |  |
|  | PSNL | #006 | Maeda Miwako | maeda@xxx.co.jp |  |
|  | PSNL | #005 | Mita Mitsuru | mita@ccc.com |  |
|  | SHR | #006 | Miura Masashi | miura@zzz.co.jp |  |
|  | SHR | #010 | Saida Makoto | saida@aaa.com |  |
|  | SHR | #005 | Saito Noboru | saito@yyy.ne.jp |  |
|  | PSNL | #007 | Sasaki Hiroshi | sasaki@aaa.com |  |
|  | PSNL | #008 | Sato Haruka | sato@aaa.com |  |
|  | PSNL | #001 | Suto Manabu | suto@bbb.com |  |
|  | PSNL | #002 | Yamada Kento | yamada@xxx.co.jp |  |

Fig. 31

| Selection | Address Book | Reg. No. | Destination Name | Address Information | Additional Information |
|---|---|---|---|---|---|
| | PSNL | #004 | Aida Kenji | aida@bbb.com | Registered in duplicate |
| | PSNL | #009 | Aoki Taro | aoki@zzz.co.jp | |
| ON | PSNL | #010 | Arai Satoshi | arai@yyy.ne.jp | There is a registration with a different address info. |
| | SHR | #008 | Arai Satoshi | arai@bbb.com | There is a registration with a different address info. |
| | SHR | #003 | Fujii Koji | fujii@yyy.ne.jp | |
| | SHR | #004 | Hayashi Jun | hayashi@ccc.com | |
| | SHR | #009 | Inoue Akira | inoue@xxx.co.jp | |
| | PSNL | #003 | Ito Yasuo | ito@xxx.co.jp | |
| | SHR | #001 | Kato Ken | kato@aaa.com | |
| | SHR | #002 | Kimura Jiro | kimura@bbb.com | |
| | PSNL | #006 | Maeda Miwako | maeda@xxx.co.jp | |
| | PSNL | #005 | Mita Mitsuru | mita@ccc.com | |
| | SHR | #006 | Miura Masashi | miura@zzz.co.jp | |
| | SHR | #010 | Saida Makoto | saida@aaa.com | |
| | SHR | #005 | Saito Noboru | saito@yyy.ne.jp | |
| | PSNL | #007 | Sasaki Hiroshi | sasaki@aaa.com | |
| | PSNL | #008 | Sato Haruka | sato@aaa.com | |
| | PSNL | #001 | Suto Manabu | suto@bbb.com | |
| | PSNL | #002 | Yamada Kento | yamada@xxx.co.jp | |

Fig. 32

| Address Book | Reg. No. |
|---|---|
| PSNL | #010 |

INFORMATION PROCESSING APPARATUS THAT DISPLAYS DESTINATION DISPLAY INFORMATION ACCORDING TO DISPLAY CONDITION

CROSS REFERENCE

The present application is related to, claims priority from and incorporates by reference Japanese Patent Application No. 2013-246714, filed on Nov. 28, 2013.

TECHNICAL FIELD

The present invention relates to an information processing apparatus that manages destination information by distributing the destination information in a plurality of address books.

BACKGROUND

A conventional information processing apparatus is provided with a communication function, manages destination information of communication destinations using a plurality of personal address books that each can be accessed and referenced by an individual user and a shared address book that can be accessed and referenced by all users, and displays an address book display screen after selecting a display target address book (for example, see Japanese Patent Laid-Open Publication No. 2007-81652).

However, in the conventional technology, there is a problem that wasteful operations may occur and the number of operations until desired destination information is displayed may increase when a user does not know about destination information registered in each of the address books, for example, despite that desired destination information is registered in a personal address book, the shared address book is selected to search for destination information and a desired destination information is not found, and the shared address book is closed and the personal address book is opened again to search for the desired destination information. A purpose of the present invention is to solve such a problem to allow desired destination information to be displayed with a simple operation.

SUMMARY

An information processing apparatus disclosed in the application includes: a memory that stores destination information; an operation part that receives an operation; a for-display destination information generation part that generates for-display destination information based on the destination information; and a display part that displays the for-display destination information. The operation part receives a display switch operation, the destination information includes a first destination information group and a second destination information group, and the for-display destination information generation part, based on a single operation of the display switch operation, switches the for-display destination information between a display of the first destination information group, a display of the second destination information group, and a display of both of the first destination information group and the second destination information group.

According to the present invention, an effect is obtained that desired destination information can be displayed with a simple operation.

BRIEF DESCRIPTION OF DRAWINGS

FIG. 13 illustrates an explanatory diagram of an address book display screen (simultaneous display of a personal address book and a shared address book; registration number order) of the first embodiment.

FIG. 14 illustrates an explanatory diagram of an address book display screen (simultaneous display of a personal address book and a shared address book; alphabetical order) of the first embodiment.

FIG. 17 illustrates a for-display address book (simultaneous display of a personal address book and a shared address book; alphabetical order) of the first embodiment.

FIG. 18 illustrates an explanatory diagram of a personal address book of the first embodiment.

FIG. 19 illustrates an explanatory diagram of a shared address book of the first embodiment.

FIG. 30 illustrates an explanatory diagram of an address book display screen (simultaneous display of a personal address book and a shared address book; alphabetical order; before editing) of the second embodiment.

FIG. 31 illustrates an explanatory diagram of an address book display screen (simultaneous display of a personal address book and a shared address book; alphabetical order; after editing) of the second embodiment.

FIG. 32 illustrates an explanatory diagram of destination selection information of the second embodiment.

DETAILED EMBODIMENTS

In the following, with reference to the drawings, embodiments of an information processing apparatus according to the present invention are described.

First Embodiment

Figure 2:
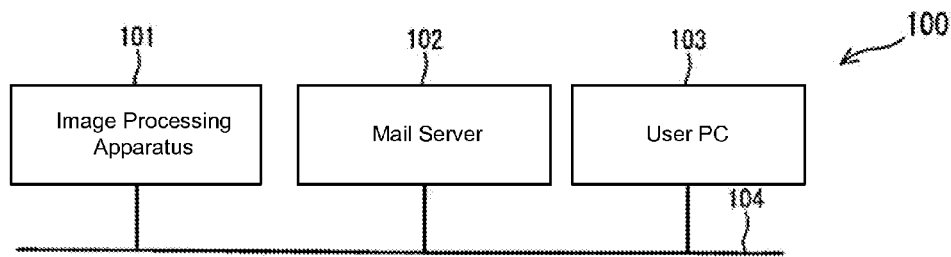
FIG. 2 illustrates a block diagram illustrating a configuration of an information processing system of the first embodiment.

FIG. 2 illustrates a block diagram illustrating a configuration of an information processing system of a first embodiment. In FIG. 2, an information processing system 100 is configured by an image processing apparatus 101 as an information processing apparatus, a mail server 102, a user PC (Personal Computer) 103 and a network 104. The image processing apparatus 101 is an apparatus that reads an image of a document to generate image data, and transmits the image data as an attachment to an e-mail. The mail server 102 is a server computer that delivers an e-mail. The user PC 103 is a computer on which an e-mail client software for receiving an e-mail is installed.

The network 104 is a communication line that connects the image processing apparatus 101, the mail server 102 and the user PC 103 using known communication technologies. In the information processing system 100 that is configured as described above, the e-mail to which the image data of the document that is read by the image processing apparatus 101 is attached is transmitted from the image processing apparatus 101 to the user PC 103 via the mail server 102. An overall configuration of the information processing system 100 that is described in the present embodiment illustrates a required minimum configuration for realizing a function of transmitting an e-mail using the image processing apparatus 101.

Figure 3:
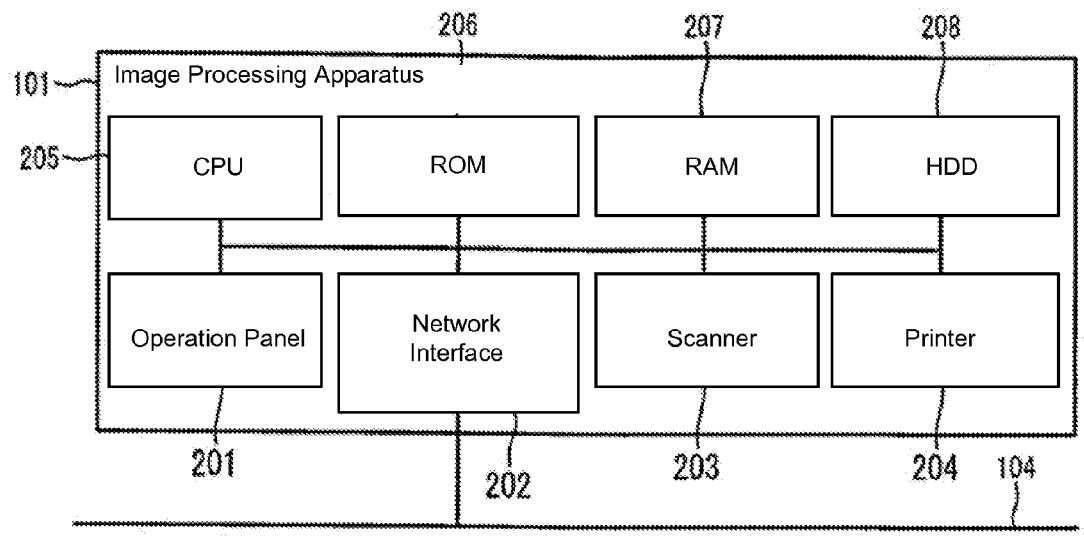
FIG. 3 illustrates a block diagram illustrating a configuration of an image processing apparatus of the first embodiment.

FIG. 3 illustrates a block diagram illustrating a configuration of an image processing apparatus of the first embodiment. In FIG. 3, the image processing apparatus 101 is configured by an operation panel 201, a network interface 202, a scanner 203, a printer 204, a CPU (Central Processing Unit) 205, a ROM (Read Only Memory) 206, a RAM (Random Access Memory) 207 and a HDD (Hard Disk Drive) 208. The operation panel 201 as an operation part and a display part has an input means that is configured by a touch panel and operation keys, and a display means such as a display, displays various information, and receives an input operation of a user.

The network interface 202 is a communication means that transmits and receives data via the network 104. The scanner 203 is a reading means that reads a document and generates image data. The printer 204 is an image forming means that performs printing by forming an image on a medium. The CPU 205 is a controller that controls an overall operation of the image processing apparatus 101 based on a control program (software) stored in the ROM 206. The ROM 206 is a nonvolatile memory that stores the control program (software) for controlling the overall operation of the image processing apparatus 101. The RAM 207 is a volatile memory that temporarily stores various kinds of information.

Figure 4:
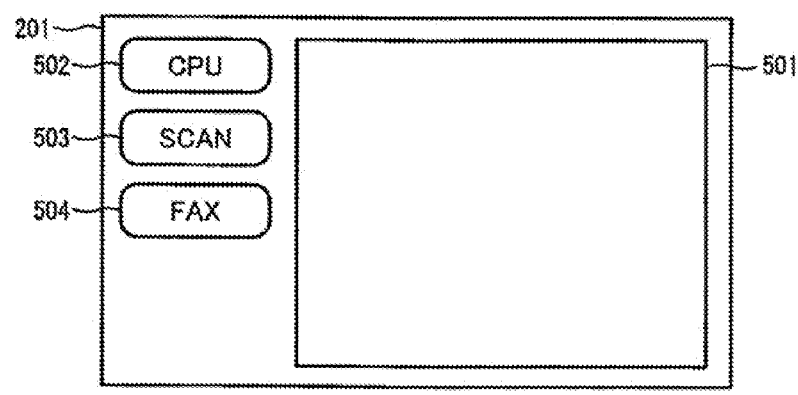
FIG. 4 illustrates an explanatory diagram of an operation panel of the first embodiment.

The HDD 208 is a memory that permanently stores various kinds of information such as a personal address book 301 and a shared address book 302, which will be described later, as destination information. In the present embodiment, since the printer 204 is not used, the image processing apparatus 101 may be configured without the printer 204. FIG. 4 illustrates an explanatory diagram of an operation panel of the first embodiment. In FIG. 4, the operation panel 201 is configured by a touch panel 501 that displays texts and images and receives a touch input, and operation keys including a COPY key 502, a SCAN key 503 and a FAX key 504 that are depressed for transitioning to respective function modes.

Figure 1:
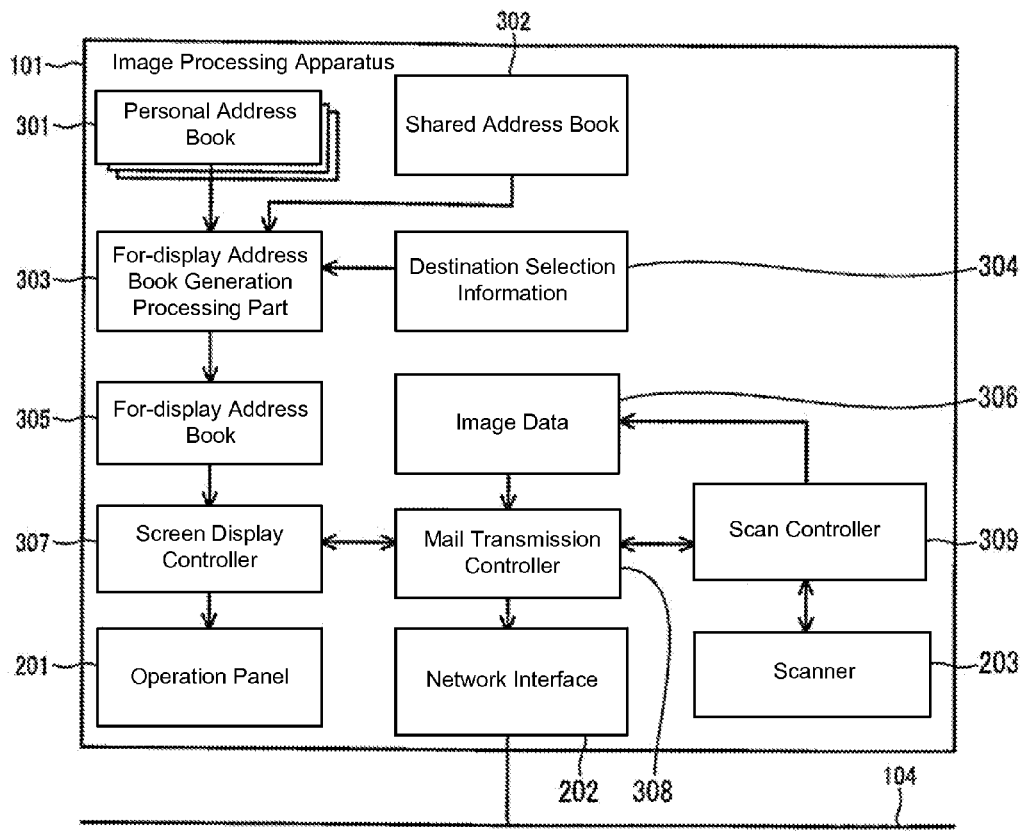
FIG. 1 illustrates a block diagram illustrating a control configuration of an image processing apparatus of a first embodiment.

FIG. 1 illustrates a block diagram illustrating a control configuration of the image processing apparatus of the first embodiment. In FIG. 1, the image processing apparatus 101 is configured by a personal address book 301 as a first destination information group (personal destination information group), a shared address book 302 as a second destination information group (shared destination information group), a for-display address book generation processing part 303, destination selection information 304, a for-display address book 305 as for-display destination information, image data 306, a screen display controller 307, a mail transmission controller 308, a scan controller 309, an operation panel 201, a network interface 202, and a scanner 203.

The personal address book 301 as a personal destination information group is created for each user and is an address book that only the user can use. For example, as illustrated in FIG. 18, the personal address book 301 is configured by a registration number 2501, a destination name 2502 such as a name, and address information 2503 such as an e-mail address, and the destination name 2502 and the address information 2503 are associated with the registration number 2501. The shared address book 302 as a share destination information group is an address book that all users can use. For example, as illustrated in FIG. 19, the shared address book 302 is configured by a registration number 2701, a destination name 2702 such as a name, and address information 2703 such as an e-mail address, and the destination name 2702 and the address information 2703 are associated with the registration number 2701.

The personal address book 301 and the shared address book 302 are information that is permanently stored in the HDD 208 illustrated in FIG. 3. In the present embodiment, the registration number 2501 of the personal address book 301 and the registration number 2701 of the shared address book 302 are independently granted registration numbers. Further, in the personal address book 301 and the shared address book 302, the destination name and the address information are sorted in an ascending order of the registration number. The for-display address book generation processing part 303 as a for-display destination information generation part generates the for-display address book 305 as for-display destination information based on the personal address book 301 and the shared address book 302 that are stored in the HDD 208.

Figure 22:
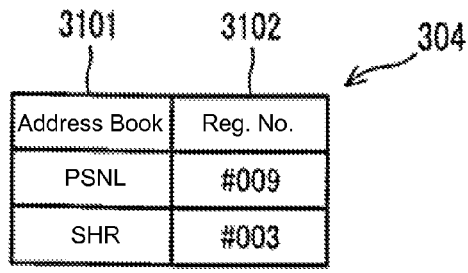
FIG. 22 illustrates an explanatory diagram of destination selection information of the first embodiment.

The destination selection information 304 is data indicating destination information that is selected in an address book display screen (to be described later). For example, as illustrated in FIG. 22, the destination selection information 304 is configured by an address book 3101 that represents types of the personal address book and the shared address book, and a registration number 3102. The for-display address book 305 is an address book that is displayed in the address book display screen (to be described later). For example, as illustrated in FIG. 17, the for-display address book 305 is configured by a selection 2801 that indicates presence or absence of a selection, an address book 2802 that indicates a type of an address book, a registration number 2803, a destination name 2804 and address information 2805.

The image data 306 is data read from the scanner 203 under the control of the scan controller 309. The destination selection information 304, the for-display address book 305 and the image data 306 are temporarily stored in the RAM 207 illustrated in FIG. 3. The screen display controller 307 performs control that displays information on and receives an input from the operation panel 201. In the present embodiment, the for-display address book 305 is displayed on the operation panel 201.

The mail transmission controller 308 transmits, via the network interface 202, an e-mail to which the image data 306 is attached. The scan controller 309 controls the scanner 203 to read the image data 306. The for-display address book generation processing part 303, the screen display controller 307, the mail transmission controller 308, and the scan controller 309 are control programs that are stored in the ROM 206, and are executed by the CPU 205 illustrated in FIG. 3.

Figure 5:
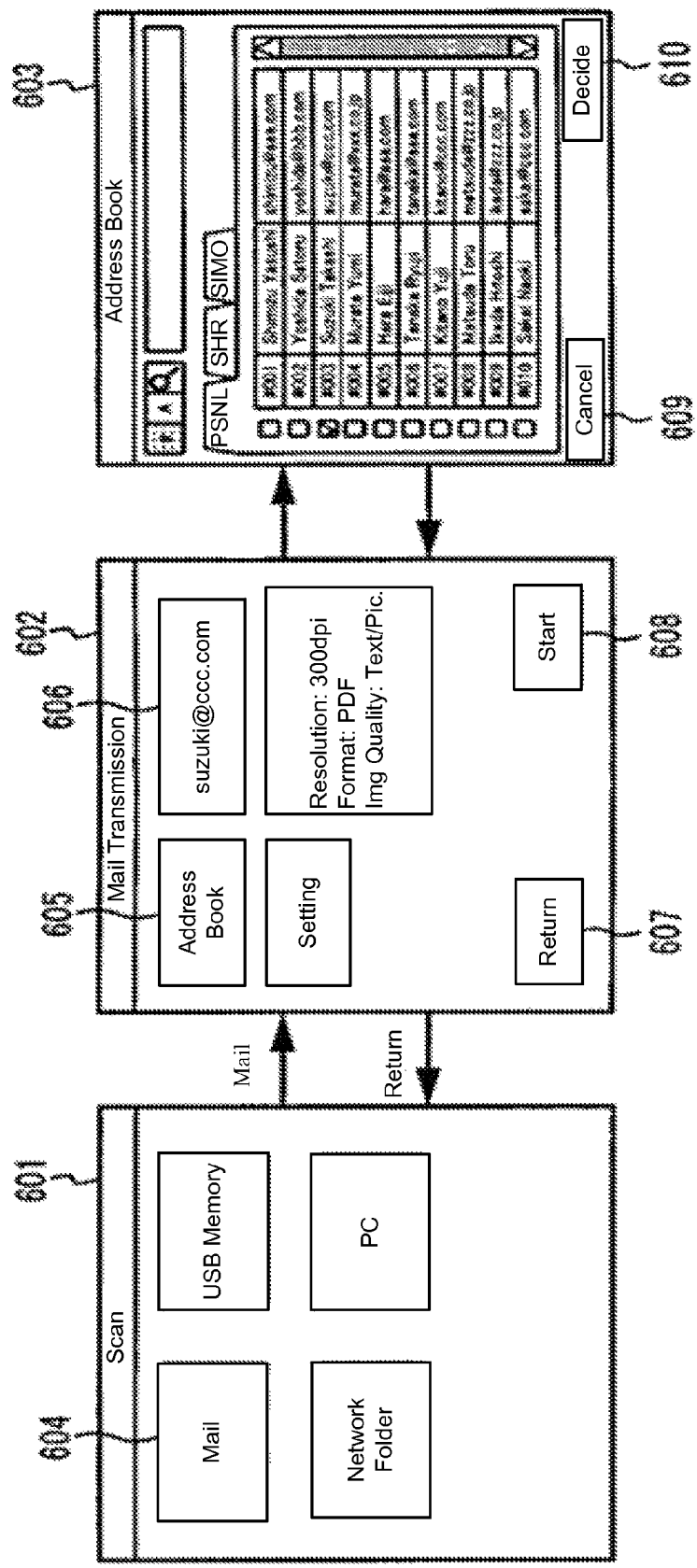
FIG. 5 illustrates an explanatory diagram of a mail transmission operation screen of the first embodiment.

An operation of the configuration described above is described. First, transition of a screen during an e-mail transmission operation is described based on an explanatory diagram of an e-mail transmission operation screen of the first embodiment illustrated in FIG. 5. A scan screen 601 illustrated in FIG. 5 is a screen displayed in the touch panel 501 when the SCAN key 503 of the operation panel 201 illustrated in FIG. 4 is depressed. In the scan screen 601, when a mail button 604 is depressed, the screen transitions to a mail transmission screen 602. In the mail transmission screen 602, when an address book button 605 is depressed, the screen transitions to an address book screen 603.

In the address book screen 603, when a decision button 610 is depressed, selection of a destination is determined and the screen returns to the mail transmission screen 602. In the address book screen 603, an abbreviation "PSNL" means personal, an abbreviation "SHR" means shared, and an abbreviation "SIMO" means simultaneous, and those abbreviations are used in the other drawings as well. In this case, when one or more destinations are selected in the address book screen 603, address information of the selected destinations is displayed in a destination display area 606 of the mail transmission screen 602. The destination display area 606 in FIG. 5 illustrates a state in which "Suzuki@ccc.com" is selected. Further, in the address book screen 603, when a cancel button 609 is depressed, selection of a destination is canceled and the screen returns to the mail transmission screen 602.

In the mail transmission screen 602, when a start button 608 is depressed, the mail transmission controller 308 illustrated in FIG. 1 transmits an e-mail, to which the image data 306 that is read by the scanner 203 under the control of the scan controller 309, to the address information (mail address) of the selected destination. In the mail transmission screen 602, when a return button 607 is depressed, the screen returns to the scan screen 601. In this way, the screen transitions during a mail transmission operation.

Figure 6:
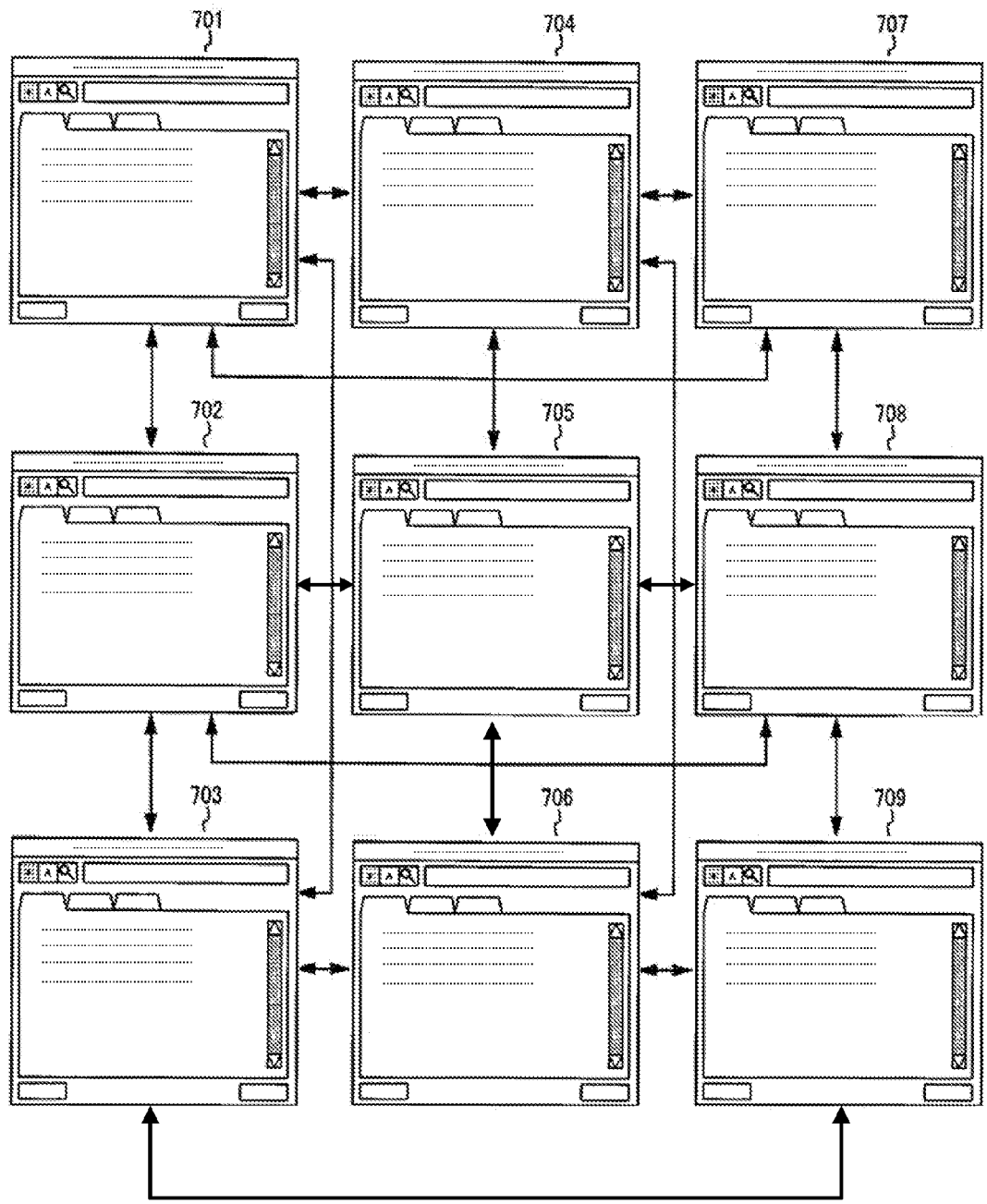
FIG. 6 illustrates an explanatory diagram of an address book display screen of the first embodiment.
Figure 7:
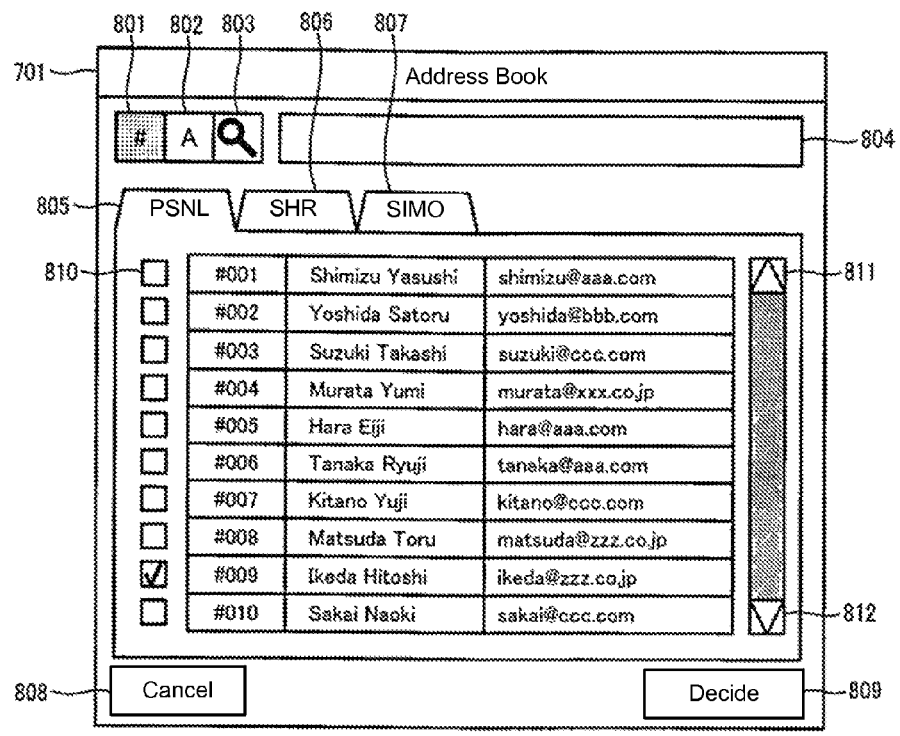
FIG. 7 illustrates an explanatory diagram of an address book display screen (personal address book; registration number order) of the first embodiment.

Next, transition of the address book display screen is described based on the explanatory diagram of the address book display screen of the first embodiment illustrated in FIG. 6 and based on FIGS. 7-15, with reference FIG. 1. Note, in order to simplify the figure, the details of the address book display screens 701-709 are omitted in FIG. 6. FIGS. 7-15 are respectively enlarged views of an address book display screen 701, an address book display screen 702, an address book display screen 703, an address book display screen 704, an address book display screen 705, an address book display screen 706, an address book display screen 707, an address book display screen 708, and an address book display screen 709 that are illustrated in FIG. 6.

Further, FIG. 18 illustrates an explanatory diagram of a personal address book of the first embodiment, and FIG. 19 illustrates an explanatory diagram of a shared address book of the first embodiment. In the address book display screen 701 illustrated in FIG. 7, a tab (Personal) 805, a tab (Shared) 806 and a tab (Simultaneous) 807 are tabs that specify an address book of a display target. When the tab 805 is selected, the personal address book 301 is displayed; when the tab 806 is selected, the shared address book 302 is displayed; and when the tab 807 is selected, both the personal address book 301 and the shared address book 302 are displayed.

Figure 16:
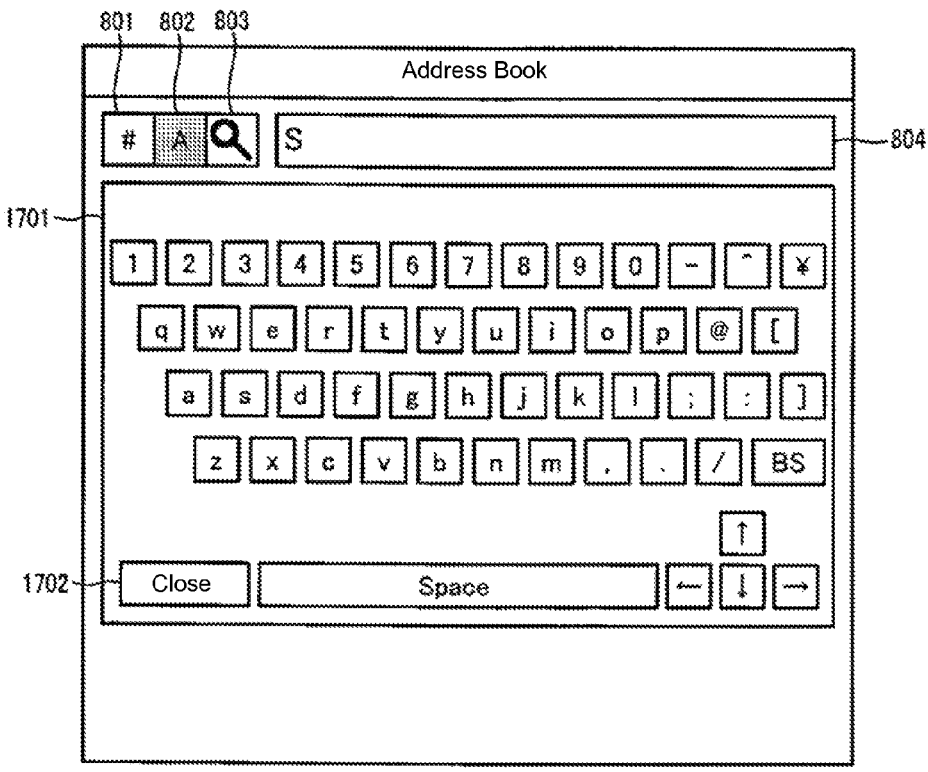
FIG. 16 illustrates an explanatory diagram of a search character string input screen of the first embodiment.

Display condition specifying buttons 801, 802 and 803 are buttons that specify a display condition of an address book. When the display condition specifying button 801 is selected, the address book is displayed in registration number order; and when the display condition specifying button 802 is selected, the address book is displayed in alphabetical order of the destination names. Further, in a case where there is no input in a character string specifying area 804 when the display condition specifying button 803 is depressed, a software keyboard 1701 illustrated in FIG. 16 is displayed. Characters that are input using the software keyboard 1701 are input in the character string specifying area 804, and when a close button 1702 is depressed, the screen returns to the original address book display screen 701 illustrated in FIG. 7. Also when the character string specifying area 804 is directly depressed, the software keyboard 1701 illustrated in FIG. 16 is displayed.

A destination selection checkbox 810 is used for selecting a destination. A destination for which the destination selection checkbox 810 is checked is indicated as being selected. When an unchecked destination selection checkbox 810 is depressed, the destination selection checkbox 810 is in a checked state, and when a checked destination selection checkbox 810 is depressed, the destination selection checkbox 810 is in an unchecked state. In the address book display screen 701 illustrated in FIG. 7, the tab 805 is selected and the display condition specifying button 801 is selected. Therefore, the personal address book 301 is displayed in registration number order.

Figure 8:
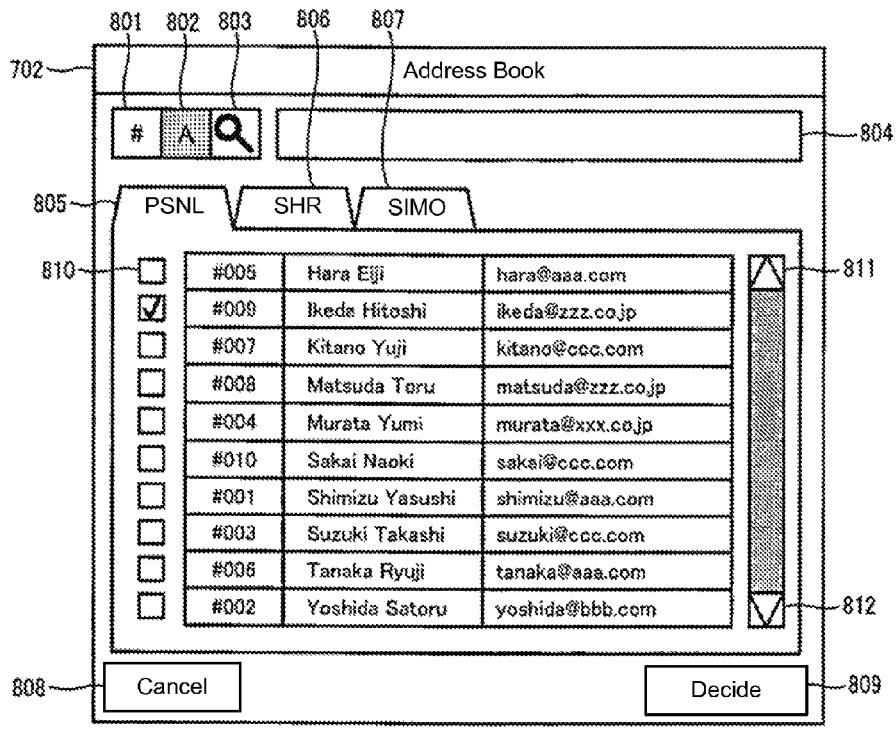
FIG. 8 illustrates an explanatory diagram of an address book display screen (personal address book; alphabetical order) of the first embodiment.
Figure 9:
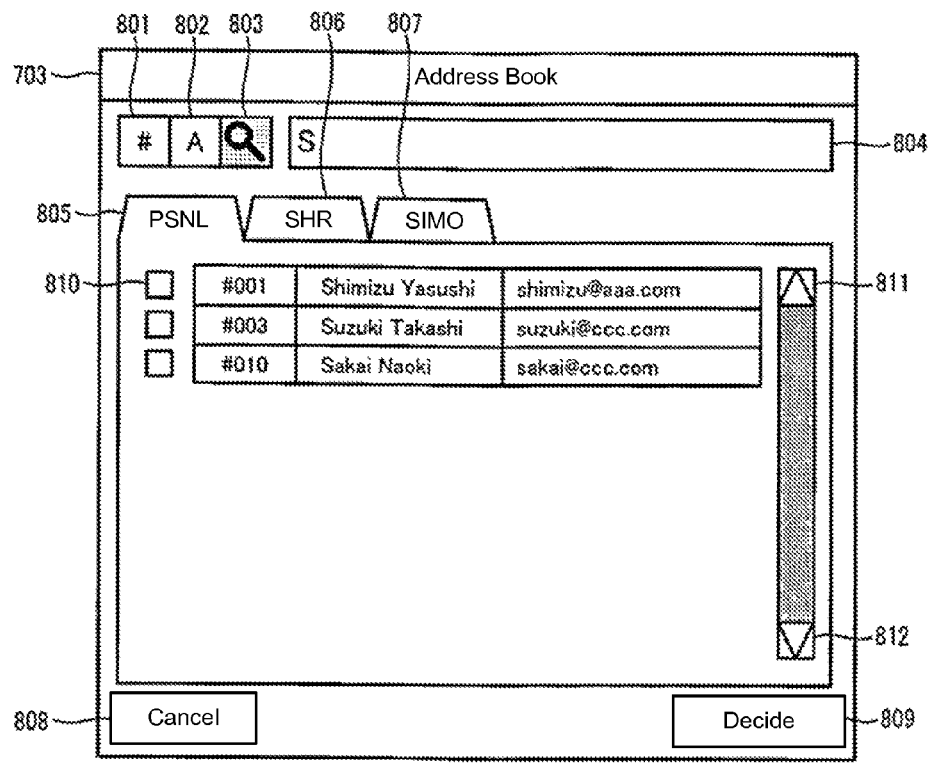
FIG. 9 illustrates an explanatory diagram of an address book display screen (personal address book; character string search) of the first embodiment.
Figure 10:
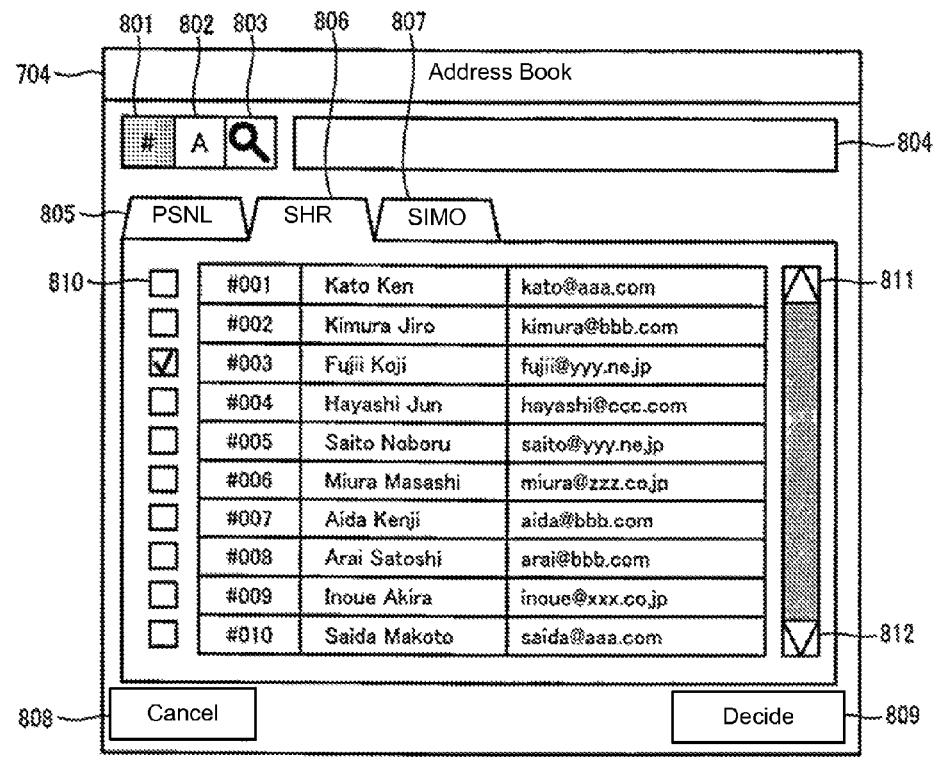
FIG. 10 illustrates an explanatory diagram of an address book display screen (shared address book; registration number order) of the first embodiment.

In the address book display screen 702 illustrated in FIG. 8, the tab 805 is selected and the display condition specifying button 802 is selected. Therefore, the personal address book 301 is displayed in alphabetical order. In the address book display screen 703 illustrated in FIG. 9, the tab 805 is selected, the display condition specifying button 803 is selected, and an "S" is input in the character string specifying area 804. Therefore, only address information of destinations for which the destination names begin with "S" in the personal address book 301 is displayed. In the address book display screen 704 illustrated in FIG. 10, the tab 806 is selected and the display condition specifying button 801 is selected. Therefore, the destination names of the shared address book 302 are displayed in registration number order.

Figure 11:
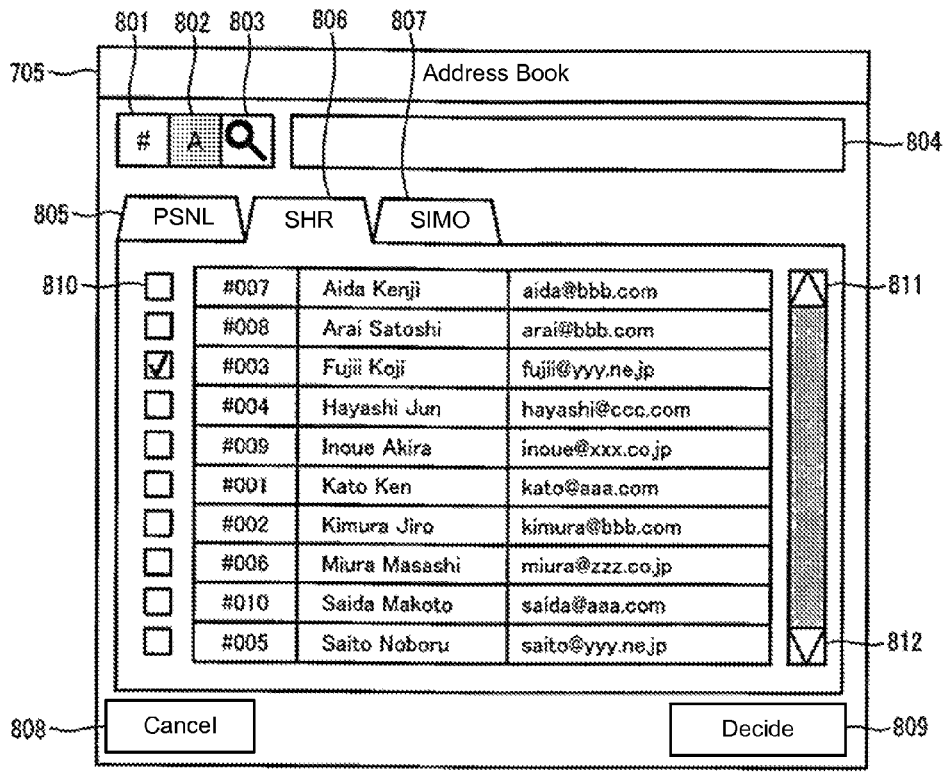
FIG. 11 illustrates an explanatory diagram of an address book display screen (shared address book; alphabetical order) of the first embodiment.
Figure 12:
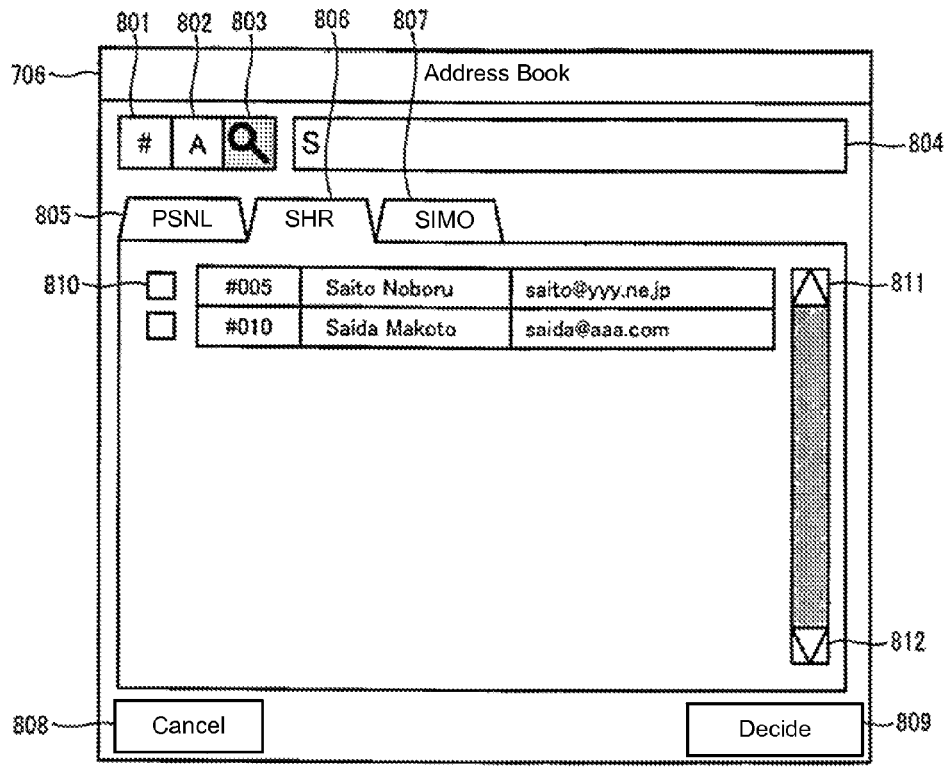
FIG. 12 illustrates an explanatory diagram of an address book display screen (shared address book; character string search) of the first embodiment.
Figure 15:
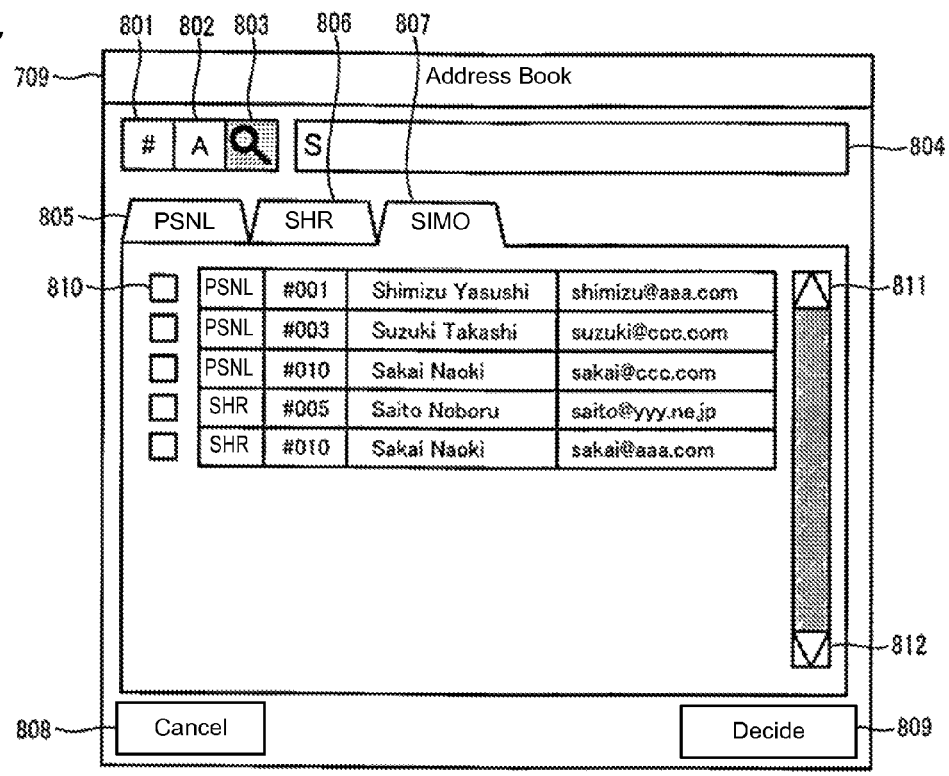
FIG. 15 illustrates an explanatory diagram of an address book display screen (simultaneous display of a personal address book and a shared address book; character string search) of the first embodiment.

In the address book display screen 705 illustrated in FIG. 11, the tab 806 is selected and the display condition specifying button 802 is selected. Therefore, the destination names of the shared address book 302 are displayed in alphabetical order. In the address book display screen 706 illustrated in FIG. 12, the tab 806 is selected, the display condition specifying button 803 is selected, and an "S" is input in the character string specifying area 804. Therefore, only address information of destinations for which the destination names begin with "S" in the shared address book 302 is displayed. In the address book display screen 707 illustrated in FIG. 13, the tab 807 is selected and the display condition specifying button 801 is selected. Therefore, both the personal address book 301 and the shared address book 302 are displayed in registration number order.

In the address book display screen 708 illustrated in FIG. 14, the tab 807 is selected and the display condition specifying button 802 is selected. Therefore, both the personal address book 301 and the shared address book 302 are displayed in alphabetical order. In the address book display screen 709 illustrated in FIG. 15, the tab 807 is selected, the display condition specifying button 803 is selected, and an "S" is input in the character string specifying area 804. Therefore, only address information of destinations for which the destination names begin with "S" in both the personal address book 301 and the shared address book 302 is displayed.

As described above, in the present embodiment, the display of the personal address book 301, the display of the shared address book 302 and the display of both of the personal address book 301 and the shared address book 302 are independently/distinctively/separately displayed. In other words, they are displayed in different formats. Further, a plurality of display conditions that are specified using the display condition specifying buttons 801, 802, 803 can be switched by one single operation. Even when the tabs 805, 806, 807 are moved, states of the display condition specifying buttons 801, 802, 803 and a character string input in the character string specifying area 804 are maintained. Further, even when the tabs 805, 806, 807 are moved, a state of the destination selection checkbox 810 is maintained.

Figure 20:
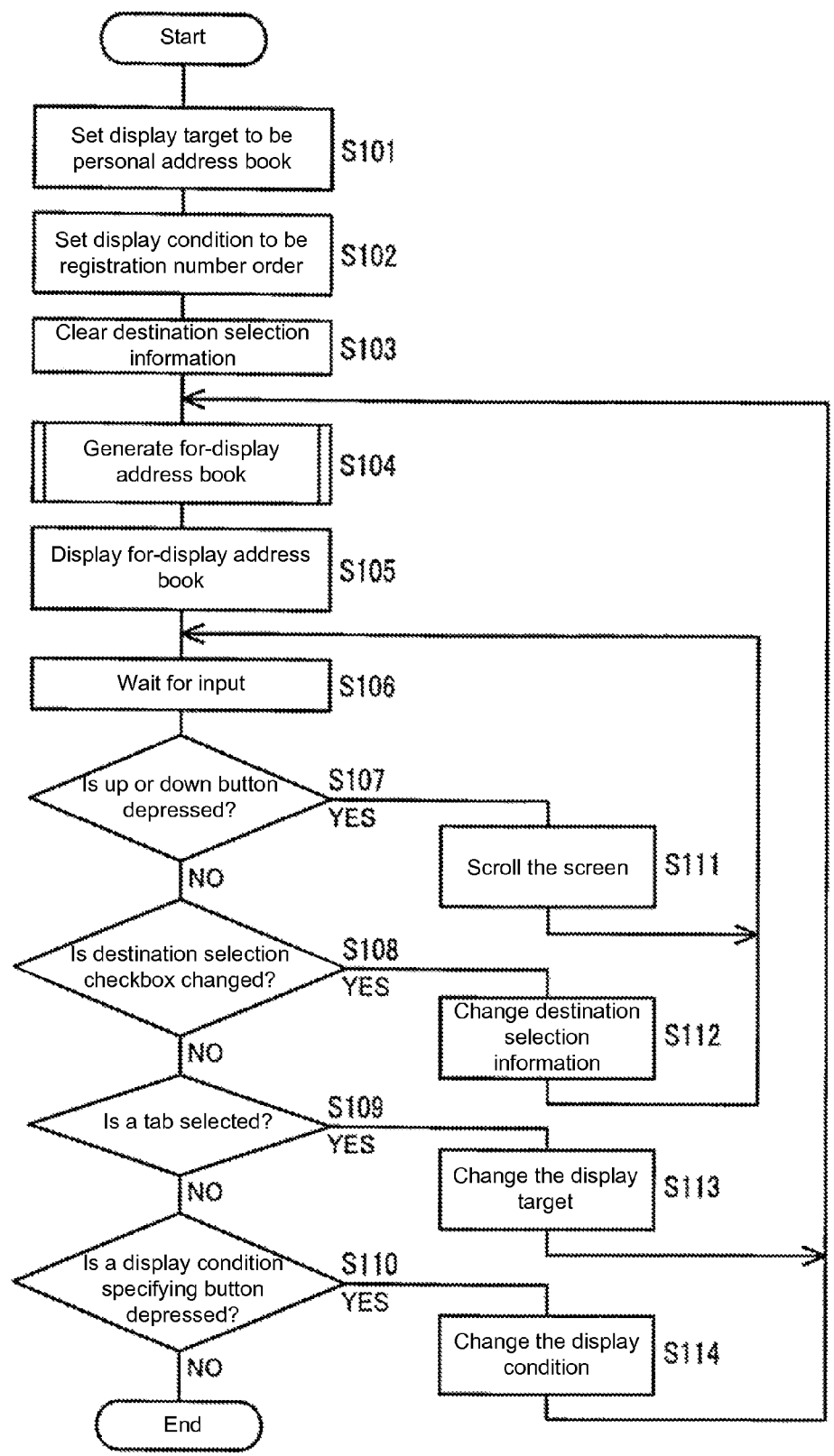
FIG. 20 illustrates a flow diagram illustrating flow of an address book display process of the first embodiment.

Next, an address book display process that is performed by the image processing apparatus is described following steps that are indicated using S in the flow diagram of FIG. 20 that illustrates flow of the address book display process of the first embodiment, with reference to FIG. 1. It is assumed that the screen displayed in the operation panel 201 has transitioned from the mail transmission screen 602 to the address book display screen 603 illustrated in FIG. 5. S101: The screen display controller 307 of the image processing apparatus 101 sets a display target to be the personal address book 301, as an initial screen of the address book display screen. S102: Further, the screen display controller 307 sets the display condition to be the registration number order, as the initial screen of the address book display screen. S103: Further, the screen display controller 307 clears the destination selection information 304 to make the destinations in a state in which selection is not performed.

S104: The for-display address book generation processing part 303 performs a for-display address book generation process to generate the for-display address book 305. Details of the for-display address book generation process will be described later. S105: The screen display controller 307 displays the generated for-display address book 305 as an address book display screen (for example, the address book display screen 701 illustrated in FIG. 7) on the operation panel 201. S106: The screen display controller 307 waits for an operation by a user in the displayed address book display screen. S107: When the screen display controller 307 judges that an input due to an operation of a user is a depression of an up-down button (for example, an up button 811 or a down button 812 of the address book display screen 701 illustrated in FIG. 7), the screen display controller 307 causes the processing to proceed to S111; and when the screen display controller 307 judges that the input of the user is not a depression of the up-down button, the screen display controller 307 causes the processing to proceed to S108.

S108: When the screen display controller 307 judges that an input due to an operation of a user is a change in a destination selection checkbox (for example, the destination selection checkbox 810 of the address book display screen 701 illustrated in FIG. 7), the screen display controller 307 causes the processing to proceed to S112; and when the screen display controller 307 judges that the input is not a change in the destination selection checkbox, the screen display controller 307 causes the processing to proceed to S109. S109: When the screen display controller 307 judges that an input due to an operation of a user is a selection of a tab (for example, the tabs 805, 806, 807 of the address book display screen 701 illustrated in FIG. 7) (display switch operation), the screen display controller 307 causes the processing to proceed to S113; and when the screen display controller 307 judges that the input of the user is not a selection of a tab, the screen display controller 307 causes the processing to proceed to S110.

S110: When the screen display controller 307 judges that an input due to an operation of a user is a depression of a display condition specifying button (for example, the display condition specifying buttons 801, 802, 803 of the address book display screen 701 illustrated in FIG. 7), the screen display controller 307 causes the processing to proceed to S114; and when the screen display controller 307 judges that the input of the user is not a depression of the display condition specifying button, that is, a depression of a decision button or a cancel button (for example, the decision button 809 or the cancel button 808 of the address book display screen 701 illustrated in FIG. 7), the screen display controller 307 terminates the present processing. S111: The screen display controller 307 that has judged that the input is a depression of the up-down button scrolls the screen in a specified direction, and causes the processing to proceed to S106. S112: The screen display controller 307 that has judged that the input is a change in the destination selection checkbox changes the destination selection information 304 and 307 causes the processing to proceed to S106.

S113: The screen display controller 307 that has judged that the input is a selection of a tab changes the display target and causes the processing to proceed to S104 to generate the for-display address book 305 and displays the for-display address book 305 generated at S105 as an address book display screen (for example, the address book display screen 701 illustrated in FIG. 7) on the operation panel 201. In the present embodiment, when a display switch operation is received on the operation panel 201, based on the single display switch operation, the for-display address book generation processing part 303 generates the for-display address book 305 so as to switch the display of the personal address book 301, the display of shared address book 302 and the display of both the personal address book 301 and the shared address book 302.

S114: The screen display controller 307 that has judged that the input is a depression of a display condition specifying button changes the display condition and causes the processing to proceed to S104 to generate the for-display address book 305 and displays the for-display address book 305 generated at S105 as an address book display screen (for example, the address book display screen 701 illustrated in FIG. 7) on the operation panel 201. In the present embodiment, when an input operation of a display condition is received on the operation panel 201, based on the input display condition, the for-display address book generation processing part 303 generates the for-display address book 305 while maintaining the input display condition between the display of the personal address book 301, the display of the shared address book 302 and the display of both the personal address book 301 and the shared address book 302.

Figure 21:
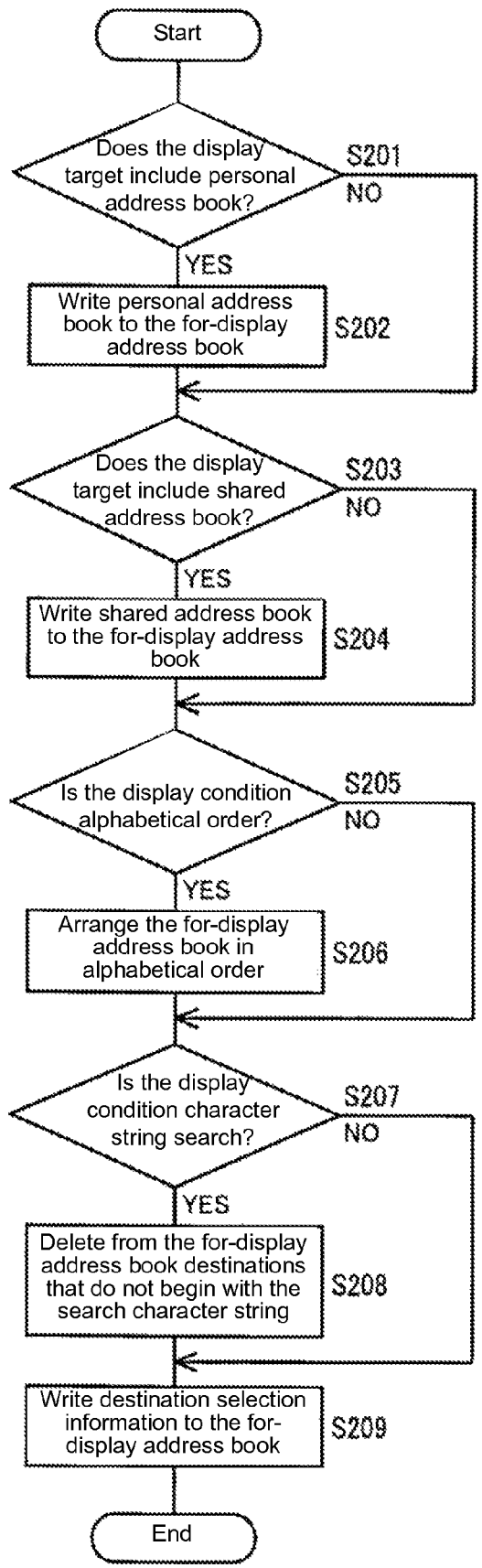
FIG. 21 illustrates a flow diagram illustrating flow of a for-display address book generation process of the first embodiment.

Next, a for-display address book generation process that is performed by the for-display address book generation processing part 303 at the above-described S104 in FIG. 20 is described following steps that are indicated using S in the flow diagram of FIG. 21 that illustrates flow of the for-display address book generation process of the first embodiment, with reference to FIG. 1. S201: The for-display address book generation processing part 303 of the image processing apparatus 101 judges whether or not the personal address book 301 is included in the display target, causes the processing to proceed to S202 when it is judged that the personal address book 301 is included in the display target, and causes the processing to proceed to S203 when it is judged that the personal address book 301 is not included in the display target. S202: The for-display address book generation processing part 303 that has judged that the personal address book 301 is included in the display target writes content of the personal address book 301 to the for-display address book 305.

S203: The for-display address book generation processing part 303 judges whether or not the shared address book 302 is included in the display target, causes the processing to proceed to S204 when it is judged that the shared address book 302 is included in the display target, and causes the processing to proceed to S205 when it is judged that the shared address book 302 is not included in the display target. S204: The for-display address book generation processing part 303 that has judged that the shared address book 302 is included in the display target writes content of the shared address book 302 to the for-display address book 305. S205: The for-display address book generation processing part 303 judges whether or not the display condition is alphabetical order, causes the processing to proceed to S206 when it is judged that the display condition is alphabetical order, and causes the processing to proceed to S207 when it is judged that the display condition is not alphabetical order. S206:

The for-display address book generation processing part 303 that has judged that the display condition is alphabetical order rearranges the content of the for-display address book 305 in alphabetical order.

S207: The for-display address book generation processing part 303 judges whether or not the display condition is a character string search, causes the processing to proceed to S208 when it is judged that the display condition is a character string search, and causes the processing to proceed to S209 when it is judged that the display condition is not a character string search. S208: The for-display address book generation processing part 303 that has judged that the display condition is a character string search deletes from the for-display address book 305 the registration number, the destination name and the address information that do not begin with a character string that is input to a character string specifying area of the address book display screen (for example, the character string specifying area 804 of the address book display screen 701 illustrated in FIG. 7). S209: The for-display address book generation processing part 303 makes a reference to the destination selection information 304, writes the destination selection information to the for-display address book 305, and terminates the present processing.

Next, results of the above-described address book display process are described based on FIGS. 14, 17-19 and 22, with reference to FIG. 1. First, the personal address book 301 is the content illustrated in FIG. 18; the shared address book 302 is the content illustrated in FIG. 19; and the destination selection information 304 is the content illustrated in FIG. 22. It is assumed that the registration number #009 of the personal address book 301 and the registration number #003 of the shared address book 302 are selected as the destinations. In this state, in the address book display screen, when it is instructed to display both the personal address book 301 and the shared address book 302 in alphabetical order, the for-display address book 305 is the content displayed in FIG. 17.

In this case, as illustrated in FIG. 17, the for-display address book 305 is the content obtained by rearranging the content of the personal address book 301 illustrated in FIG. 18 and the content of the shared address book 302 illustrated in FIG. 19 in alphabetical order. Further, information such as "Personal" representing a personal address book or "Shared" representing a shared address book is recorded in an address book 2802 of the for-display address book 305 illustrated in FIG. 17; and "ON" is recorded in a selection 2801 indicating that the registration number #009 of the personal address book and the registration number #003 of the shared address book are selected based on the destination selection information 304 illustrated in FIG. 22. The address book display screen displayed in the operation panel 201 is configured based on the content of the for-display address book 305 illustrated in FIG. 17 and becomes the address book display screen 708 illustrated in FIG. 14.

As described above, the for-display address book generation processing part 303 of the image processing apparatus 101 receives, in the address book display screen displayed on the operation panel 201, a single operation that selects an address book as display target among the personal address book, the shared address book, or both the personal address book and the shared address book, generates a for-display address book based on the selected address book, and displays the generated for-display address book on the operation panel 201. Thereby, a desired address book can be displayed with a simple operation. Further, by maintaining the display condition such as a search character string even when the address book as the display target is switched, even in the image processing apparatus that manages destination information by distributing the destination information in a plurality of address books, desired destination information can be displayed with a small number of operations.

In the present embodiment, at S103 of FIG. 20, it is described that the destination selection information 304 is initialized by being cleared. However, in a case where some destinations have already been set before transitioning from the mail transmission screen 602 to the address book display screen 603 illustrated in FIG. 5, the information of the destinations may be used as initial values of the destination selection information 304. Further, in the present embodiment, it is described that the condition that the destination names are rearranged in alphabetical order is used as a display condition. However, when the destination names are in Japanese, the destination names may be rearranged in Japanese alphabetical order. Further, in the present embodiment, an example is described in which only a single character "S" is set as a search character string of the destination names. However, it is also possible to set a character string containing a plurality of characters.

As described above, in the first embodiment, in the address book display screen, a single operation is received that selects an address book as display target among the personal address book, the shared address book, or both the personal address book and the shared address book, and a for-display address book is generated based on the selected address book and is displayed in a display part. Thereby, an effect can be obtained that a desired address book can be displayed with a simple operation. Further, by maintaining the display condition such as a search character string even when the address book as the display target is switched, even in the image processing apparatus that manages destination information by distributing the destination information in a plurality of address books, an effect can be obtained that desired destination information can be displayed with a small number of operations.

Second Embodiment

Figure 23:
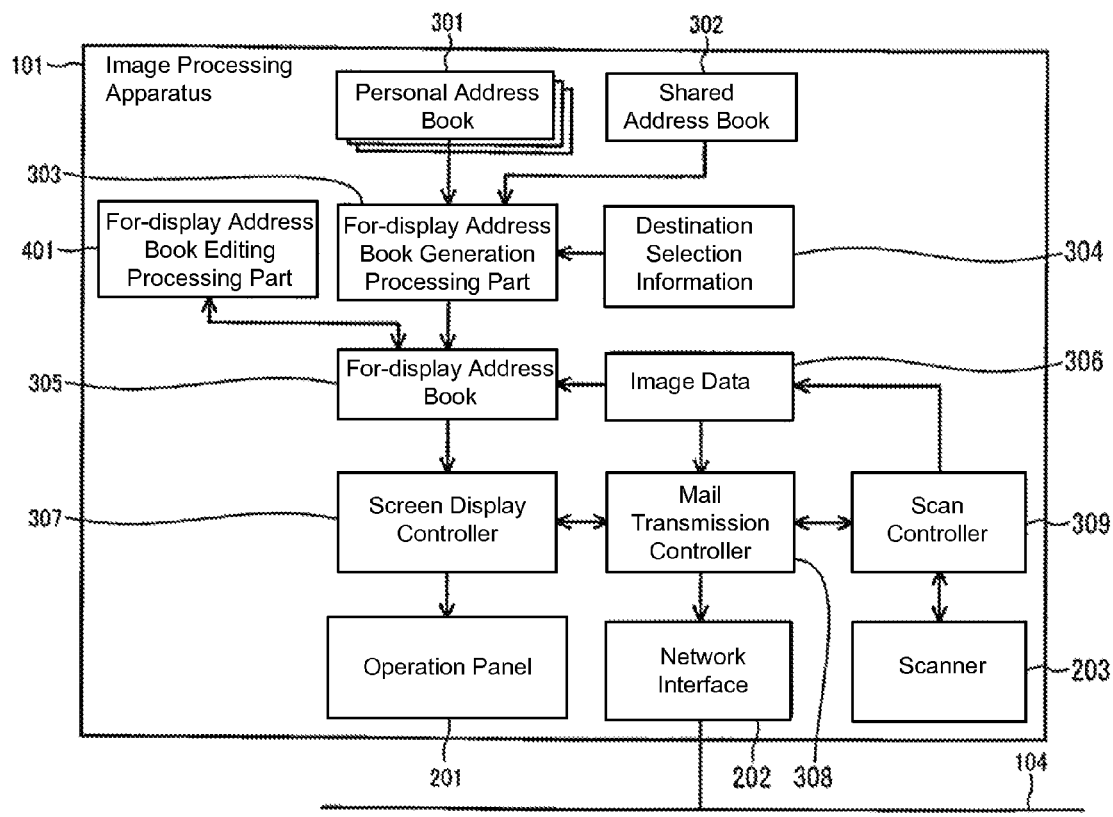
FIG. 23 illustrates a block diagram illustrating a control configuration of an image processing apparatus of a second embodiment.

A configuration of a second embodiment is obtained by adding a for-display address book editing processing part to the configuration of the first embodiment. The configuration of the second embodiment is described based on a block diagram of FIG. 23 that illustrates a control configuration of an image processing apparatus of the second embodiment. Part that are the same as in the above-described first embodiment are indicated using the same reference numeral symbols and description thereof is omitted. In FIG. 23, an image processing apparatus 101 is configured by a personal address book 301, a shared address book 302, a for-display address book generation processing part 303, a destination selection information 304, a for-display address book 305, image data 306, a screen display controller 307, a mail transmission controller 308, a scan controller 309, an operation panel 201, a network interface 202, a scanner 203, and a for-display address book editing processing part 401.

Figure 29:
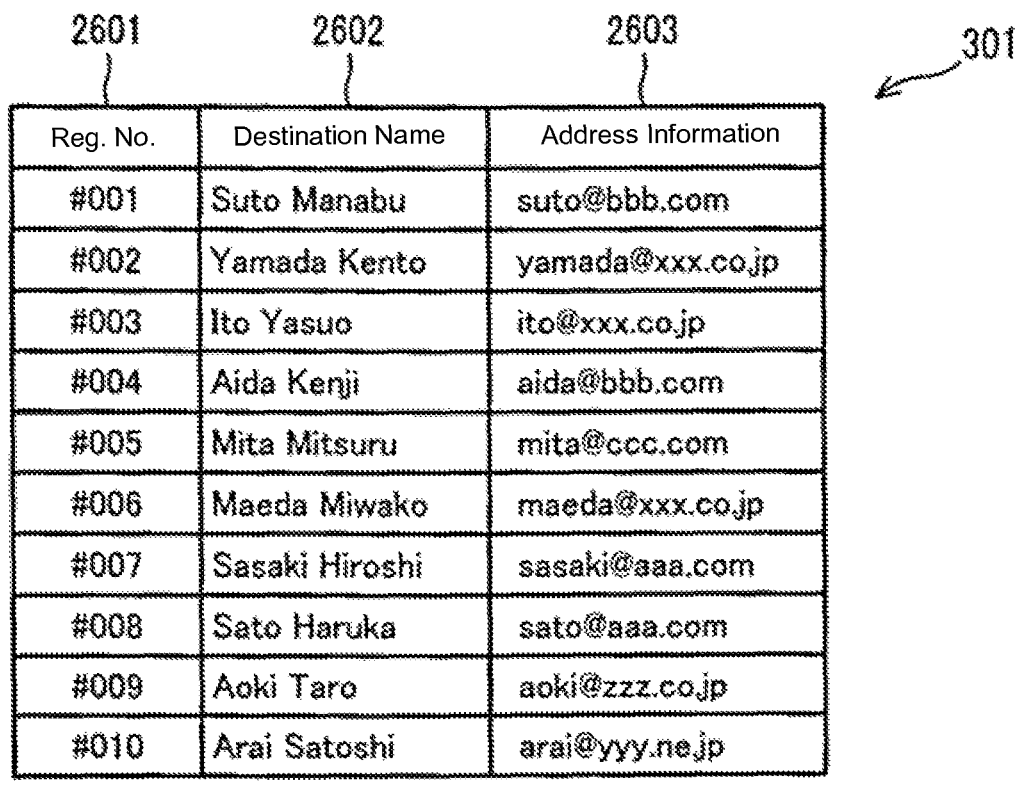
FIG. 29 illustrates an explanatory diagram of a personal address book of the second embodiment.

The personal address book 301 is created for each user and is an address book that only the user can use. For example, as illustrated in FIG. 29, the personal address book 301 is configured by a registration number 2601, a destination name 2602 such as a name, and address information 2603 such as an e-mail address, and the destination name 2602 and the address information 2603 are associated with the registration number 2601. The shared address book 302 is an address book that all users can use. For example, as illustrated in FIG. 19, the shared address book 302 is configured by a registration number 2701, a destination name 2702 such as a name, and address information 2703 such as an e-mail address, and the destination name 2702 and the address information 2703 are associated with the registration number 2701. The personal address book 301 and the shared address book 302 are information that is permanently stored in the HDD 208 illustrated in FIG. 3.

In the present embodiment, the registration number 2601 of the personal address book 301 and the registration number 2701 of the shared address book 302 are independently granted registration numbers. Further, in the personal address book 301 and the shared address book 302, the destination name and the address information are sorted in an ascending order of the registration number. The destination selection information 304 is data indicating destination information that is selected in an address book display screen (to be described later). For example, as illustrated in FIG. 32, the destination selection information 304 is configured by an address book 3201 that represents types of the personal address book and the shared address book, and a registration number 3202.

The for-display address book 305 is an address book that is displayed in the address book display screen (to be described later). The for-display address book 305 is configured by, for example, as illustrated in FIG. 30, a selection 2901 that indicates presence of absence of a selection, an address book 2902 that indicates a type of an address book, a registration number 2903, a destination name 2904, address information 2905 and additional information 2906, and further, is configured by, as illustrated in FIG. 31, a selection 3001 that indicates presence of absence of a selection, an address book 3002 that indicates a type of an address book, a registration number 3003, a destination name 3004, address information 3005 and additional information 3006.

The for-display address book editing processing part 401 edits content of the for-display address book 305. The for-display address book generation processing part 303, the screen display controller 307, the mail transmission controller 308, the scan controller 309 and the for-display address book editing processing part 401 are control programs that are stored in the ROM 206, and are executed by the CPU 205 illustrated in FIG. 3.

An operation of the configuration described above is described. Transition of a screen during an e-mail transmission operation is the same as in the first embodiment and thus description thereof is omitted. Next, an address book display screen is described based on explanatory diagrams of FIGS. 24 and 25 that illustrate address book display screens of the second embodiment, an explanatory diagram of FIG. 29 that illustrates a personal address book of the second embodiment and FIG. 19, with reference to FIG. 23. The shared address book in the second embodiment is the same as the shared address book of the first embodiment illustrated in FIG. 19. Further, in the present embodiment, transition of the address book display screen is the same as in the first embodiment and thus description thereof is omitted, and the address book display screen is described when destination information is registered in duplicate in the personal address book and the shared address book.

In the present embodiment, a registration number #004 of the personal address book 301 illustrated in FIG. 29 and a registration number #007 of the shared address book 302 illustrated in FIG. 19 are associated with the same destination name (2602, 2702) and address information (2603, 2703). That is, the completely identical destination information is registered in duplicate in the personal address book 301 and the shared address book 302. Further, a registration number #010 of the personal address book 301 illustrated in FIG. 29 and a registration number #008 of the shared address book 302 illustrated in FIG. 19 are associated with the same destination name (2602, 2702) but different address information (2603, 2703). That is, the partially identical destination information is registered in the personal address book 301 and the shared address book 302.

Figure 24:
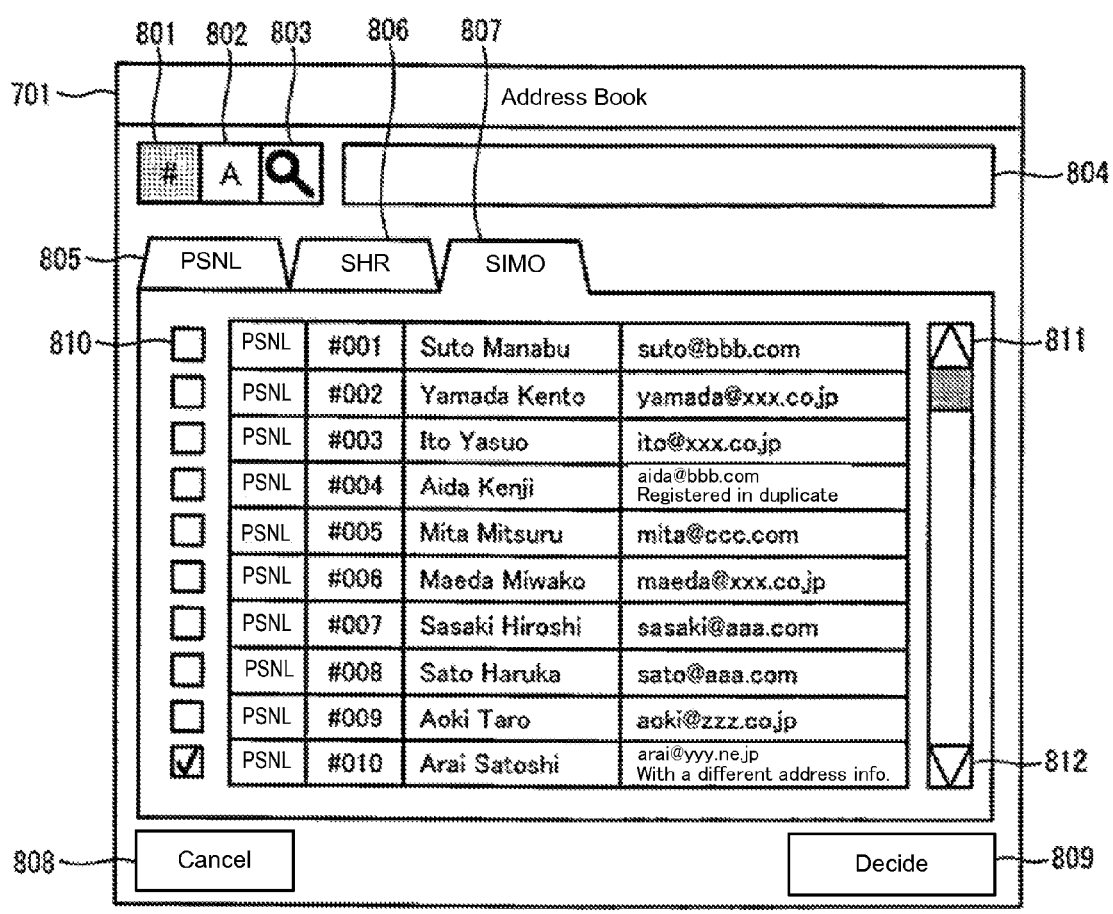
FIG. 24 illustrates an explanatory diagram of an address book display screen (simultaneous display of a personal address book and a shared address book; registration number order) of the second embodiment.
Figure 25:
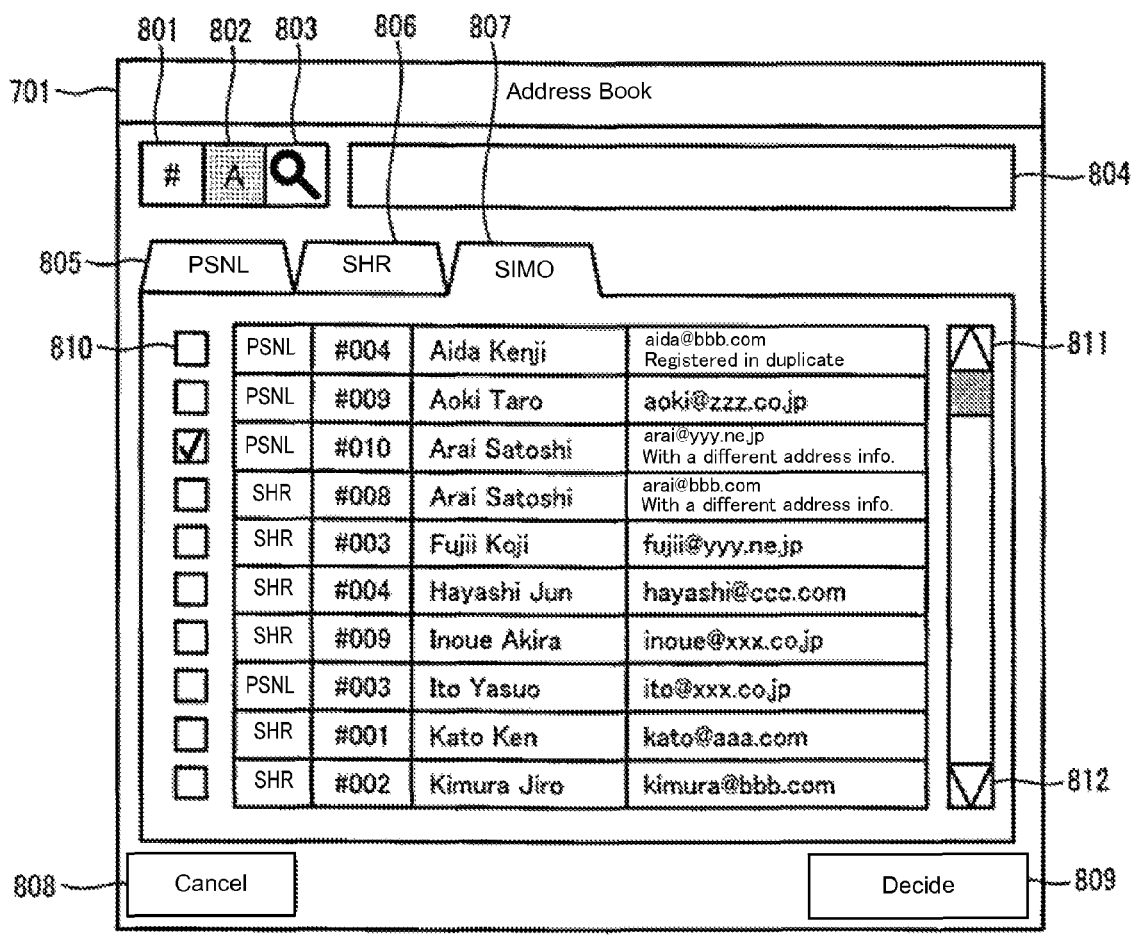
FIG. 25 illustrates an explanatory diagram of an address book display screen (simultaneous display of a personal address book and a shared address book; alphabetical order) of the second embodiment.
Figure 26:
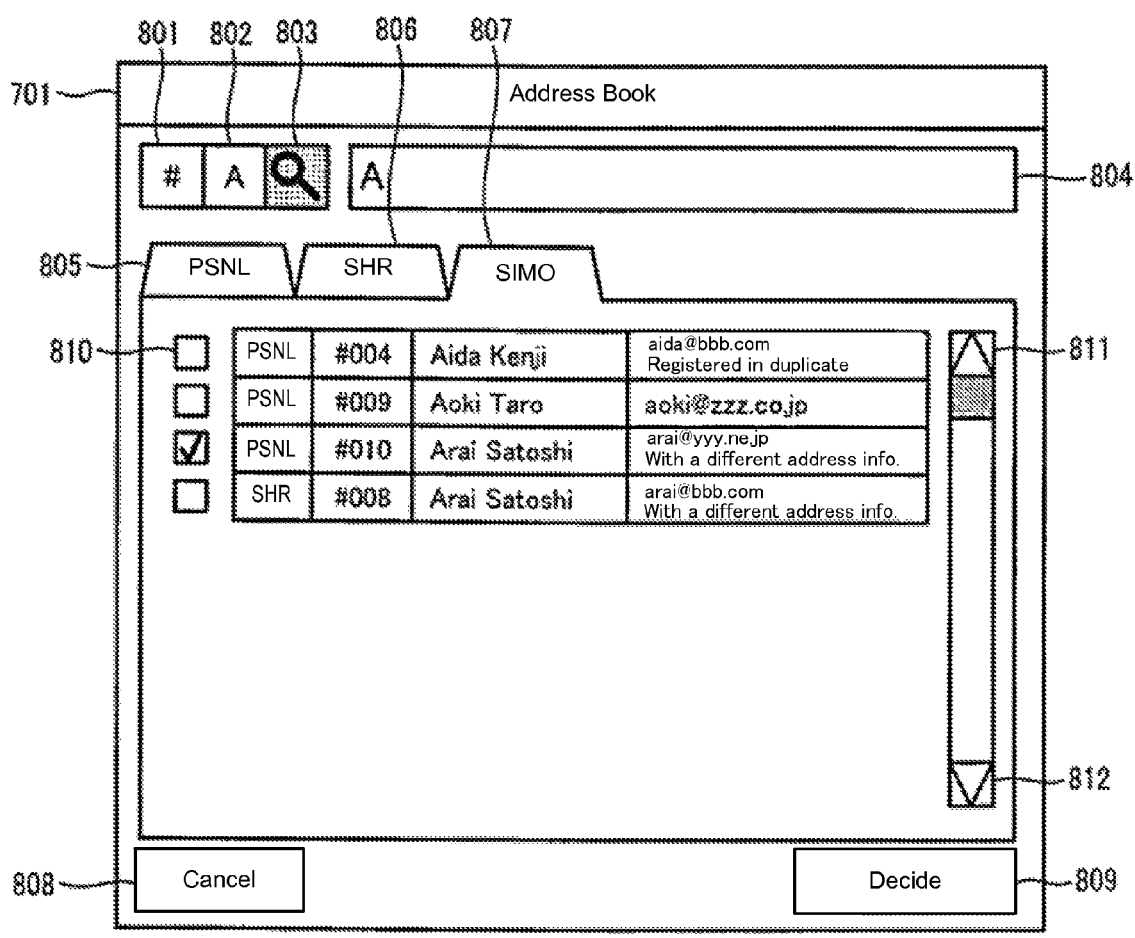
FIG. 26 illustrates an explanatory diagram of an address book display screen (simultaneous display of a personal address book and a shared address book; character string search) of the second embodiment.

As illustrated in FIG. 24, in the address display screen 701, the tab 807 is selected and the display condition specifying button 801 is selected. In this state, both the personal address book 301 and the shared address book 302 are displayed in registration number order. Further, as illustrated in FIG. 25, in the address display screen 701, the tab 807 is selected and the display condition specifying button 802 is selected. In this state, both the personal address book 301 and the shared address book 302 are displayed in alphabetical order. Further, as illustrated in FIG. 26, in the address book display screen 701, the tab 807 is selected, the display condition specifying button 803 is selected, and an "A" is input in the character string specifying area 804. In this state, only destination information for which the destination names begin with "A" in both the personal address book 301 and the shared address book 302 is displayed.

Here, in the present embodiment, as illustrated in FIGS. 24-26, when identical destination information is registered in both the personal address book 301 and the shared address book 302, the destination information registered in the personal address book 301 is registered. For example, the registration number #004 of the personal address book 301 and the registration number #007 of the shared address book 302 are associated with completely identical destination information and are registered in duplicate. Therefore, only the registration number #004 of the personal address book 301 is displayed and further a note indicating that the information is "registered in duplicate" is displayed.

Further, when partially identical destination information is registered in the personal address book 301 and the shared address book 302, a note indicating that the destination information registered in the personal address book 301 and the destination information registered in the shared address book 302 are partially different is displayed. For example, the registration number #010 of the personal address book 301 and the registration number #008 of the shared address book 302 are associated with records of destination information that have the same destination names but different address information. Therefore, the registration number #010 of the personal address book 301 and the registration number #008 of the shared address book 302 are both displayed and further a note for each of them is displayed indicating that the "address information is different."

Figure 27:
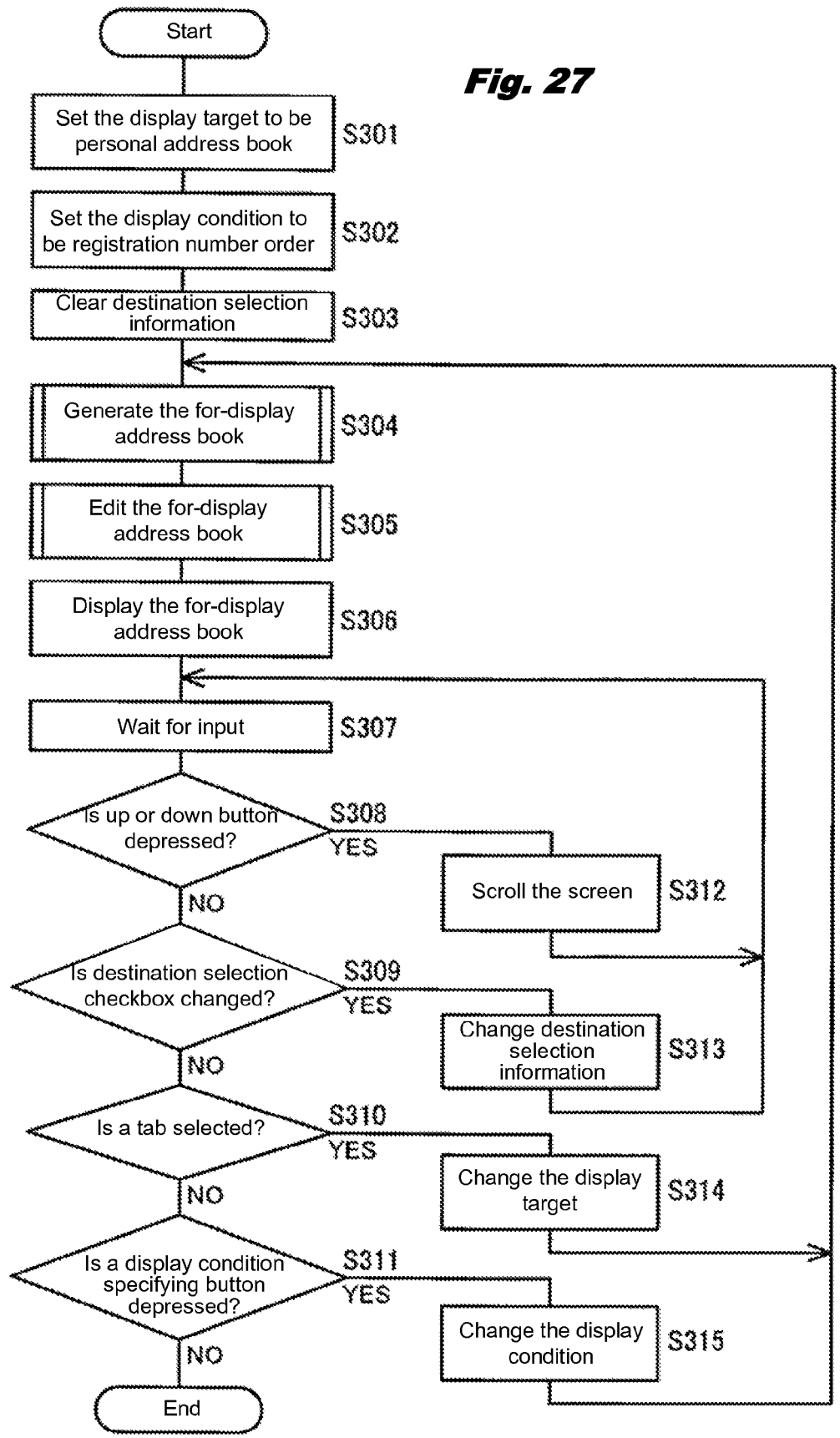
FIG. 27 illustrates a flow diagram illustrating flow of an address book display process of the second embodiment.

Next, an address book display process that is performed by the image processing apparatus is described following steps that are indicated using S in the flow diagram of FIG. 27 that illustrates flow of the address book display process of the second embodiment, with reference to FIG. 23. It is assumed that the screen displayed in the operation panel 201 has transitioned from the mail transmission screen 602 to the address book display screen 603 illustrated in FIG. 5. S301-S304: The processing at these steps is the same as S101-S104 illustrated in FIG. 20 and thus description thereof is omitted.

S305: The for-display address book editing processing part 401 performs an address book editing process in which the generated for-display address book 305 is edited. Details of the address book editing process will be described later.

S306-S315: The processing at these steps is the same as S105-S114 illustrated in FIG. 20 and thus description thereof is omitted. The for-display address book generation process that is performed by the screen display controller 307 at the above-described S304 of FIG. 27 is the same as in the first embodiment and thus description thereof is omitted.

Figure 28:
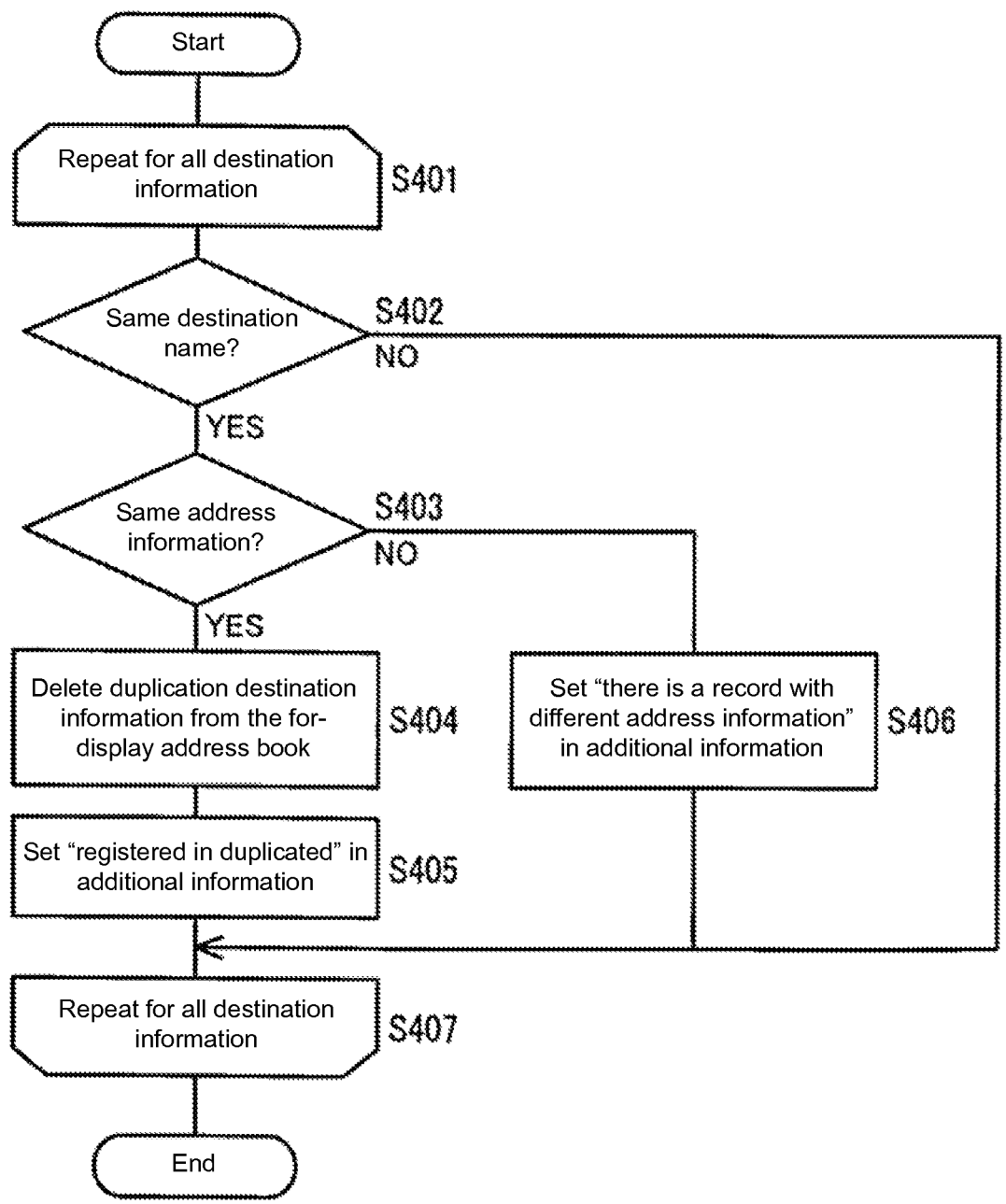
FIG. 28 illustrates a flow diagram illustrating flow of a for-display address book generation process of the second embodiment.

Next, the for-display address book editing process that is performed by the for-display address book editing processing part 401 at the above-described S305 of FIG. 27 is described following steps that are indicated using S in the flow diagram of FIG. 28 that illustrates flow of the for-display address book editing process of the second embodiment, with reference to FIG. 23. S401: The for-display address book editing processing part 401 of the image processing apparatus 101 repeatedly performs processing of S402-S406 for all records of destination information recorded in the for-display address book 305.

S402: The for-display address book editing processing part 401 judges whether or not there are records of destination information that have the same destination name in the for-display address book 305, causes the processing to proceed to S403 when it is judged that there are records of destination information that have the same destination name, and terminates the present processing when it is judged that there are not records of destination information that have the same destination name. name S403: The for-display address book editing processing part 401 that has judged that there are records of destination information that have the same destination name in the for-display address book 305 judges whether or not there are records of destination information that have the same address information in the for-display address book 305, causes the processing to proceed to S404 when it is judged that there are records of destination information that have the same address information, and causes the processing to proceed to S406 when it is judged that there are not records of destination information that have the same address information.

S404: The for-display address book editing processing part 401 that has judged that there are records of destination information that have both the same destination name and the same address information in the for-display address book 305 deletes the record of the destination information of the shared address book 302 from the for-display address book 305 as a completely identical record of the destination information registered in duplicate, and keeps the record of the destination information of the personal address book 301 in the for-display address book 305. S405: The for-display address book editing processing part 401 records a character string indicating that the record of the destination information is "registered in duplicate" in the additional information (the additional information 3006 of the for-display address book 305 illustrated in FIG. 31).

S406: The for-display address book editing processing part 401 that has judged that there are records of destination information that have identical destination names but different address information in the for-display address book 305 records a character string indicating that "there is a record with different address information" in the additional information (the additional information 3006 of the for-display address book 305 illustrated in FIG. 31) for each of the records of the destination information of the shared address book 302 and the destination information of the personal address book 301 as the records of the destination information that are partially identical. S407: The for-display address book editing processing part 401 terminates the present processing when the processing of S402-S406 is performed for all records of destination information recorded in the for-display address book 305.

Next, results of the above-described for-display address book editing process are described based on FIGS. 19 and 29-32, with reference to FIG. 23. FIGS. 29, 19 and 32 respectively illustrate contents of the personal address book 301, the shared address book 302, and the destination selection information 304. In the destination selection information 304 illustrated in FIG. 32, as indicated by the address book 3201 and the registration number 3202, the registration number #010 of the personal address book is selected as a destination.

FIG. 30 is the for-display address book 305 before the for-display address book editing process is performed, and illustrates the for-display address book 305 when both the personal address book 301 and the shared address book 302 are displayed in alphabetical order. In the for-display address book 305 illustrated in FIG. 30, the content of the personal address book 301 illustrated in FIG. 29 and the content of the shared address book 302 illustrated in FIG. 19 are rearranged in alphabetical order of the destination names. In the selection 2901, the record of the registration number #010 of the personal address book 301 is in a selected "ON" state according to the destination selection information 304 illustrated in FIG. 32.

FIG. 31 is the for-display address book 305 after the for-display address book editing process is performed, and illustrates the for-display address book 305 when both the personal address book 301 and the shared address book 302 are displayed in alphabetical order. The record of the registration number #007 of the shared address book 302 illustrated in FIG. 19 and the record of the registration number #004 of the personal address book 301 illustrated in FIG. 29 have the same destination names (2702, 2602) and the same address information (2703, 2603). Therefore, the record of the registration number #007 of the shared address book 302 is deleted from the for-display address book 305, and only the record of the registration number #004 of the personal address book 301 remains.

Further, in the additional information 3006 corresponding to the registration number #004 of the personal address book 301, a character string indicating that the record is "recorded in duplicate" is recorded. Further, the record of the registration number #010 of the personal address book 301 and the record of the registration number #008 of the shared address book 302 have the same destination name 3004 but different address information 3005. Therefore, a character string indicating that "there is a record with different address information" is recorded in the additional information 3006 corresponding to each of the registration number #010 of the personal address book 301 and the registration number #008 of the shared address book 302.

FIG. 25 illustrates the address book display screen 701 that displays for-display address book 305 illustrated in FIG. 31. In this way, when simultaneously displaying a plurality of address books, in the case where destination information is registered in duplicate between the address books that are display targets, by generating the for-display address book in which a record of the destination information registered in one of the address books is omitted, the for-display address book editing processing part 401 of the image processing apparatus 101 can display a desired destination information with a small number of operations.

As described above, in the second embodiment, in addition to the effect of the first embodiment, an effect can be obtained that, when a plurality of address books is simultaneously displayed, in the case where destination information is registered in duplicate between the address books that are display targets, by generating the for-display address book in which a record of the destination information registered in one of the address books is omitted, a desired destination information can be displayed with a small number of operations. In the first embodiment and the second embodiment, the information processing apparatus is described as an image processing apparatus. However, the present invention is not limited to this. The information processing apparatus can be any apparatus that manages destination information, such a personal computer, a facsimile machine and a multifunction machine. Further, in the first embodiment and the second embodiment, the destination information is described as destination information of an e-mail. However, the present invention is not limited to this. the destination information can also be destination information of a telephone number (including a facsimile transmission destination) and the like.

What is claimed is:

1. An information processing apparatus including a processor that executes information processing, comprising:
    a memory that stores first destination information and second destination information;
    a generation part that generates destination display information based on the first destination information and the second destination information;
    a display part that switchably displays a first destination display screen relating to the first destination information and a second destination display screen relating to the second destination information based on the destination display information, the first destination display screen including a first display condition specifying part, a second display condition specifying part and a third display condition specifying part, the first display condition specifying part specifying a first display condition for displaying destination names in the first destination information in registration number order, the second display condition specifying part specifying a second display condition for displaying the destination names in the first destination information in alphabetical order, the third display condition specifying part including a character specifying area and specifying a third display condition for displaying a destination name from among the destination names in the first destination information that includes a character specified in the character specifying area; and
    an operation part that receives an operation input from a user, the operation input including a first operation input for selecting one of the first to third display condition and a second operation input for switching the first destination information display screen to the second destination display screen, wherein
    the display part displays the first destination display screen according to the one of the first to third display condition selected by the first operation input as the first operation input is received by the operation part, and
    the display part displays the second destination display screen by switching from the first destination display screen as the second operation input is received by the operation part, a state of selection of the one of the first to third display condition and a state of designation of the character specified in the third display condition being maintained for displaying the second destination information even after switching from the first destination display screen to the second destination display screen.

2. The information processing apparatus according claim 1, wherein
the first destination information is personal destination information that can be individually used by each user, and
the second destination information is shared destination information that can be shared and used by a plurality of users.

3. The information processing apparatus according claim 1, wherein
the first destination information screen and the second destination information screen are independently displayed.

4. The information processing apparatus according claim 1, wherein
the first destination display screen is switchable to the second destination display screen with a single reception of the second operation input by the operation part.

5. The information processing apparatus according claim 1, wherein
the first destination information is personal destination information that can be used individually by each user, and
the second destination information includes the personal destination information and shared destination information that can be shared and used by a plurality of users.

6. The information processing apparatus according claim 1, wherein
the first destination information is shared destination information that can be shared and used by a plurality of users, and
the second destination information includes the shared destination information and personal destination information that can be used individually by each user.

* * * * *